United States Patent
Alessandrini

(10) Patent No.: US 11,308,634 B2
(45) Date of Patent: Apr. 19, 2022

(54) UNSUPERVISED ANCHOR HANDLING FOR MACHINE VISION SYSTEM

(71) Applicant: Datalogic I.P. Tech S.R.L., Lippo di Calderara di Reno (IT)

(72) Inventor: Martino Alessandrini, Bologna (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 114 days.

(21) Appl. No.: 16/782,405

(22) Filed: Feb. 5, 2020

(65) Prior Publication Data
US 2021/0241469 A1 Aug. 5, 2021

(51) Int. Cl.
G06K 9/62 (2022.01)
G06T 7/33 (2017.01)
G06V 10/22 (2022.01)

(52) U.S. Cl.
CPC .............. *G06T 7/33* (2017.01); *G06V 10/235* (2022.01); *G06T 2207/20081* (2013.01)

(58) Field of Classification Search
CPC ............ G06T 7/33; G06T 2207/20081; G06K 9/2081
See application file for complete search history.

(56) References Cited

U.S. PATENT DOCUMENTS

| | | | |
|---|---|---|---|
| 7,831,098 B2 | 11/2010 | Melikian | |
| 8,260,059 B2 | 9/2012 | Hofhauser et al. | |
| 9,495,607 B2 | 11/2016 | Tombari et al. | |
| 10,095,951 B2 | 10/2018 | Tombari et al. | |
| 2017/0270593 A1 | 9/2017 | Sherman et al. | |
| 2019/0244021 A1 | 8/2019 | Franchi et al. | |
| 2019/0354919 A1* | 11/2019 | Mahboob | G06F 40/295 |

(Continued)

FOREIGN PATENT DOCUMENTS

| | | |
|---|---|---|
| WO | 029399 A1 | 3/2016 |
| WO | 077934 A1 | 5/2016 |
| WO | 246250 A1 | 12/2019 |

OTHER PUBLICATIONS

EDLINES: Real-time line segment detector with a false detection control, Cuneyt Akinlar and Cihan Topal, Pattern Recognition Letters 32 (2011) 1633-1642 (10 pages).

(Continued)

*Primary Examiner* — Sean M Conner
*Assistant Examiner* — Han Hoang
(74) *Attorney, Agent, or Firm* — The Juhasz Law Firm

(57) ABSTRACT

A device includes an image sensor and a processor to: receive training images that each include multiple visual features and an ROI; receive indications of locations of ROIs within each training image; perform at least one transform on the multiple visual features and ROI of at least one training image to align the multiple visual features and ROIs among all of the training images to identify a common set of visual features present within all of the training images; derive a converged ROI from at least a portion of the ROI of at least one training image; and generate an anchor model based on the converged ROI and the common set of visual features, wherein the common set of visual features defines the anchor and are each specified relative to the converged ROI, and the anchor model is used to derive a location of a candidate ROI in an image.

20 Claims, 13 Drawing Sheets

(56) References Cited

U.S. PATENT DOCUMENTS

2020/0302168 A1* 9/2020 Vo ..................... G06N 3/0454

OTHER PUBLICATIONS

Object Recognition from Local Scale-invariant Features, David G. Lowe, Proc. Int'l Conf. on Computer Vision, Corfu, Sep. 1999 (8 pages).
SIFT Feature Point Matching Based on Improved RANSAC Algorithm, by Guangjun Shi et al., 2013 Firth Int'l Conf on Intelligent Human-Machine Systems and Cybernetics, Aug. 26-27, 2013 (4 pages).
European Search Report, EP Application 21 15 5290, dated Jun. 28, 2021 (7 pages).

* cited by examiner

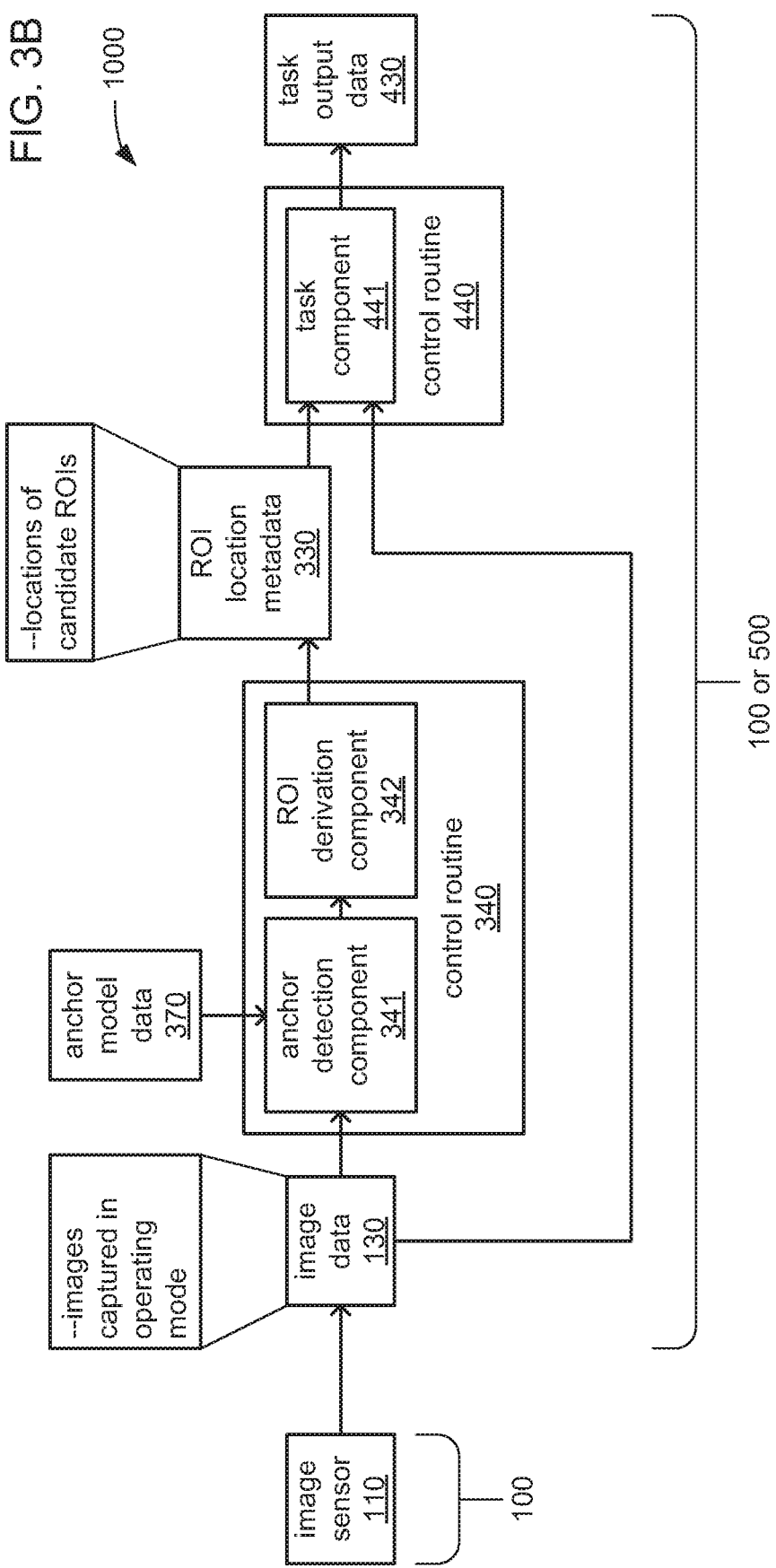

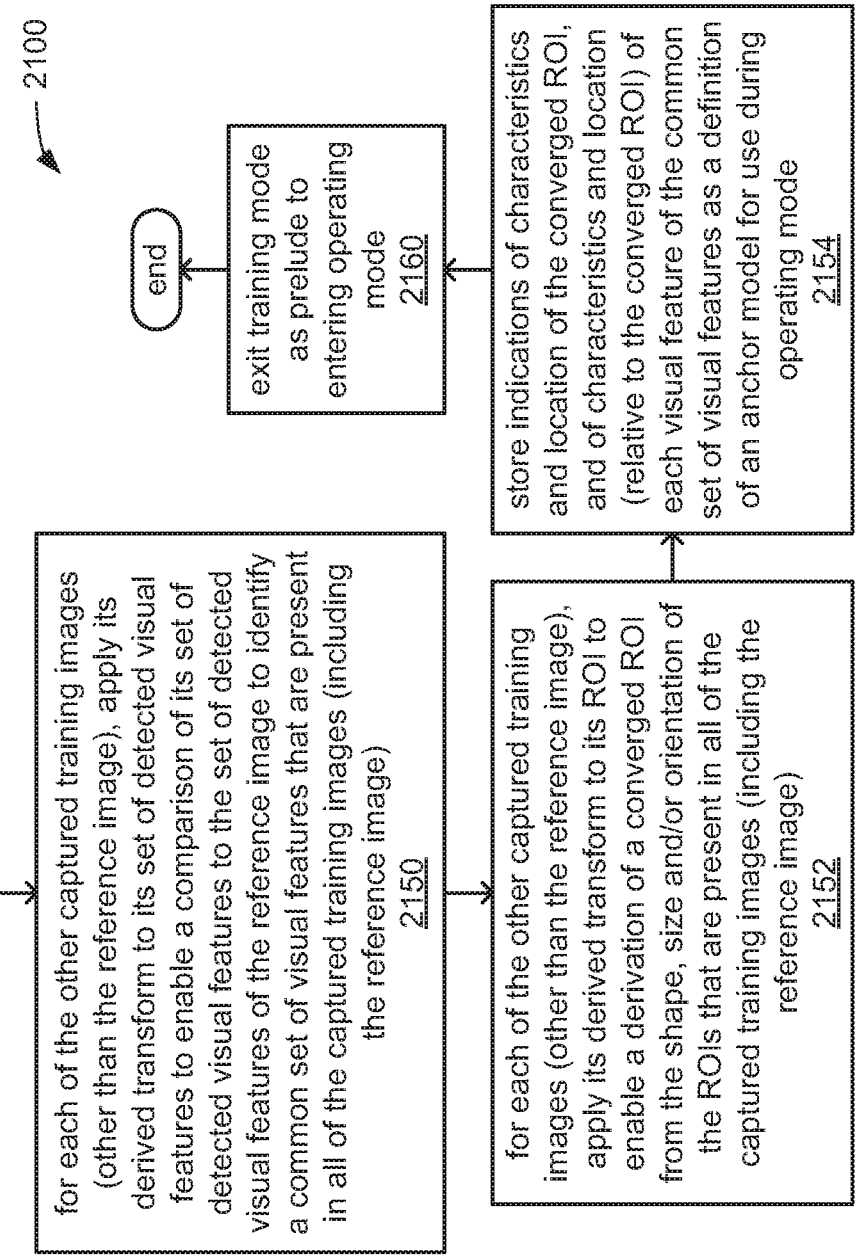

UNSUPERVISED ANCHOR HANDLING FOR MACHINE VISION SYSTEM

BACKGROUND OF THE INVENTION

1. Field of the Invention

The present invention relates to increasing efficiency and ease of use of machine vision systems.

2. Description of the Related Art

The use of machine vision systems to perform any of a variety of machine vision tasks within a region of interest (ROI) within images of large sets of images is well known. Such tasks may include the decoding of encoded data markings, the decoding of text, the recognition of objects, the taking of measurements of or between objects or points, etc. within an ROI.

Where machine vision is used to decode encoded markings carried by objects captured within images, it is well known to use one or more cameras at a location at which objects bearing one or more of such encoded data markings may be stored and/or through which such an object may be transported. By way of example, such a camera may be positioned to place a doorway or portion of the interior of a warehouse within its field of view (FOV) to enable the capture of images that include one or more encoded data markings carried on one or more surfaces of an object (e.g., a box, a crate, a palletized load, etc.) as the object is transported into the warehouse, is stored within that portion of the warehouse, and/or is transported out of the warehouse. Also by way of example, such a camera may be positioned along the path of a conveyor belt or other device along which an object may be moved that may carry one or more encoded data markings on one or more surfaces thereof. Where machine vision is used to recognize vehicles moving along a street, it is well known to use one or more cameras at a location on a pole along that street to enable the capture images of one or more portions of vehicles, including license plates and/or sides of vehicles on which indicia of vehicle models, corporate or governmental emblems and/or text may be printed as they pass through the FOV(s) thereof.

As will be familiar to those skilled in the art, searching through a captured image to directly identify an ROI at which a machine vision task is to be performed, as well as performing that machine vision task, are typically processing-intensive tasks. Also, in situations in which objects may be moved through the FOV of a camera at a relatively rapid rate (e.g., objects on a conveyor belt or vehicles on a street), there may be a relatively small amount of time between instances of an object passing through the FOV, thereby providing only a relatively small amount of time in which to perform such processing-intensive tasks.

In particular, the processing demands of searching through a captured image to directly identify each ROI at which a machine vision task is to be performed are sufficiently great that the use of specialized circuitry implemented within an application-specific integrated circuit (ASIC) or field-programmable gate array (FPGA), in addition to a processor, to offload such work from the processor has been considered. Also, the use of multiple processors among which such work would be distributed has also been considered. However, pairing such additional circuitry with a processor and/or employing multiple processors typically adds considerable undesired expense and complexity to machine vision systems, and/or typically undesirably increases their power consumption.

To reduce the processing resources required to identify each ROI at which a machine vision task is to be performed, the approach of indirectly identifying ROIs through the use of an "anchor" that is reliably associated with the presence of ROIs in images has been considered. An anchor may be a an object or portion of an object in an image that requires lesser processing resources to locate and that has been determined to be reliably present in images in which an ROI is also present. An anchor may be a particular combination of lines, geometric shapes, colors, etc. that is reliably found at a particular location in images relative to the location of an ROI.

Such use of an anchor typically requires the training of a machine vision system to recognize the anchor in an image, and to use the location and orientation of the anchor to determine the location of an associated ROI in the image. Unfortunately, such training typically requires the use of numerous training images, and for each training image, an operator of the machine vision system must provide manual input specifying both the anchor and associated ROI. In addition to being laborious, this requires the operator to decide what visual feature(s) that are present across all of the training images (e.g., what object or portion of an object) are to be used as the anchor. Unfortunately, making such a determination requires some degree of skill and understanding of the functional details of the machine vision system to avoid choosing a visual feature(s) that may be too difficult for the camera and/or other components of the machine vision system to detect and/or identify. An approach to making such anchors is needed that does not require such skills and/or understanding by an operator.

SUMMARY OF THE INVENTION

Technologies are described for making more efficient use of processing resources in identifying and interpreting differing encoded data markings, such as differing indicia and/or digital watermarks, within an image of at least a portion of an object captured by a camera without augmentation of a processor with external specialized circuitry to offload processing operations from the processor.

A device includes: an image sensor configured to capture images; storage configured to store image data representing the captured images; and a processor communicatively coupled to at least the storage. The processor is configured, during a training mode, to perform operations including: receive a set of training images captured by the image sensor, wherein each captured training image of the set of captured training images includes multiple visual features and a region of interest (ROI); receive manually input indications of a location of the ROI within each captured training image of the set of captured training images; perform at least one of a rotational transform, a translational transform, a scaling transform or a shear transform on the multiple visual features and ROI of at least one captured training image of the set of captured training images to at least partially align the multiple visual features and ROIs among all of the captured training images of the set of captured training images to identify a common set of visual features that are present within all of the captured training images; derive a converged ROI based on at least a portion of the ROI of at least one of the captured training images of the set of captured training images; and generate an anchor model based on a combination of the converged ROI and the common set of visual features, wherein the common set of visual features defines an anchor, a location of each visual feature is specified relative to the converged ROI, and the anchor model is to be used by the processor during an operating mode to derive a location of a candidate ROI relative to the anchor in a captured image.

A machine vision system includes: a camera, wherein the camera includes an image sensor configured to capture images and is configured to use an anchor model, during an operating mode of the machine vision system, to derive a location of a candidate region of interest (ROI) relative to an anchor in a captured image; a manual input device; and a control device communicatively coupled to at least the camera and the input device, and including a processor. The processor is configured, during a training mode of the machine vision system, to perform operations including: receive, from the camera, a set of training images captured by the image sensor, wherein each captured training image of the set of captured training images includes multiple visual features and an ROI; receive, from the input device, manually input indications of a location of the ROI within each captured training image of the set of captured training images; perform at least one of a rotational transform, a translational transform, a scaling transform or a shear transform on the multiple visual features and ROI of at least one captured training image of the set of captured training images to at least partially align the multiple visual features and ROIs among all of the captured training images of the set of captured training images to identify a common set of visual features that are present within all of the captured training images; derive a converged ROI based on at least a portion of the ROI of at least one of the captured training images of the set of captured training images; and generate the anchor model based on a combination of the converged ROI and the common set of visual features, wherein the common set of visual features defines the anchor, and a location of each visual feature is specified relative to the converged ROI.

A method includes, during a training mode, performing operations including: receiving, at a processor and from an image sensor, a set of training images captured by the image sensor, wherein each captured training image of the set of captured training images includes multiple visual features and a region of interest (ROI); receiving, at the processor, manually input indications of a location of the ROI within each captured training image of the set of captured training images; performing, by the processor, at least one of a rotational transform, a translational transform, a scaling transform or a shear transform on the multiple visual features and ROI of at least one captured training image of the set of captured training images to at least partially align the multiple visual features and ROIs among all of the captured training images of the set of captured training images to identify a common set of visual features that are present within all of the captured training images; deriving, by the processor, a converged ROI based on at least a portion of the ROI of at least one of the captured training images of the set of captured training images; and generating, by the processor, an anchor model based on a combination of the converged ROI and the common set of visual features, wherein the common set of visual features defines an anchor, a location of each visual feature is specified relative to the converged ROI, and the anchor model is to be used by the processor during an operating mode to derive a location of a candidate ROI relative to the anchor in a captured image.

BRIEF DESCRIPTION OF THE DRAWINGS

FIGS. 3A and 3B, together, show aspects of an example internal architecture of the machine vision system of either FIG. 1A or 1B.

FIGS. 5A and 5B, together, show aspects of a training mode of the machine vision system of either FIG. 1A or 1B.

DETAILED DESCRIPTION OF THE INVENTION

Figure 1A:
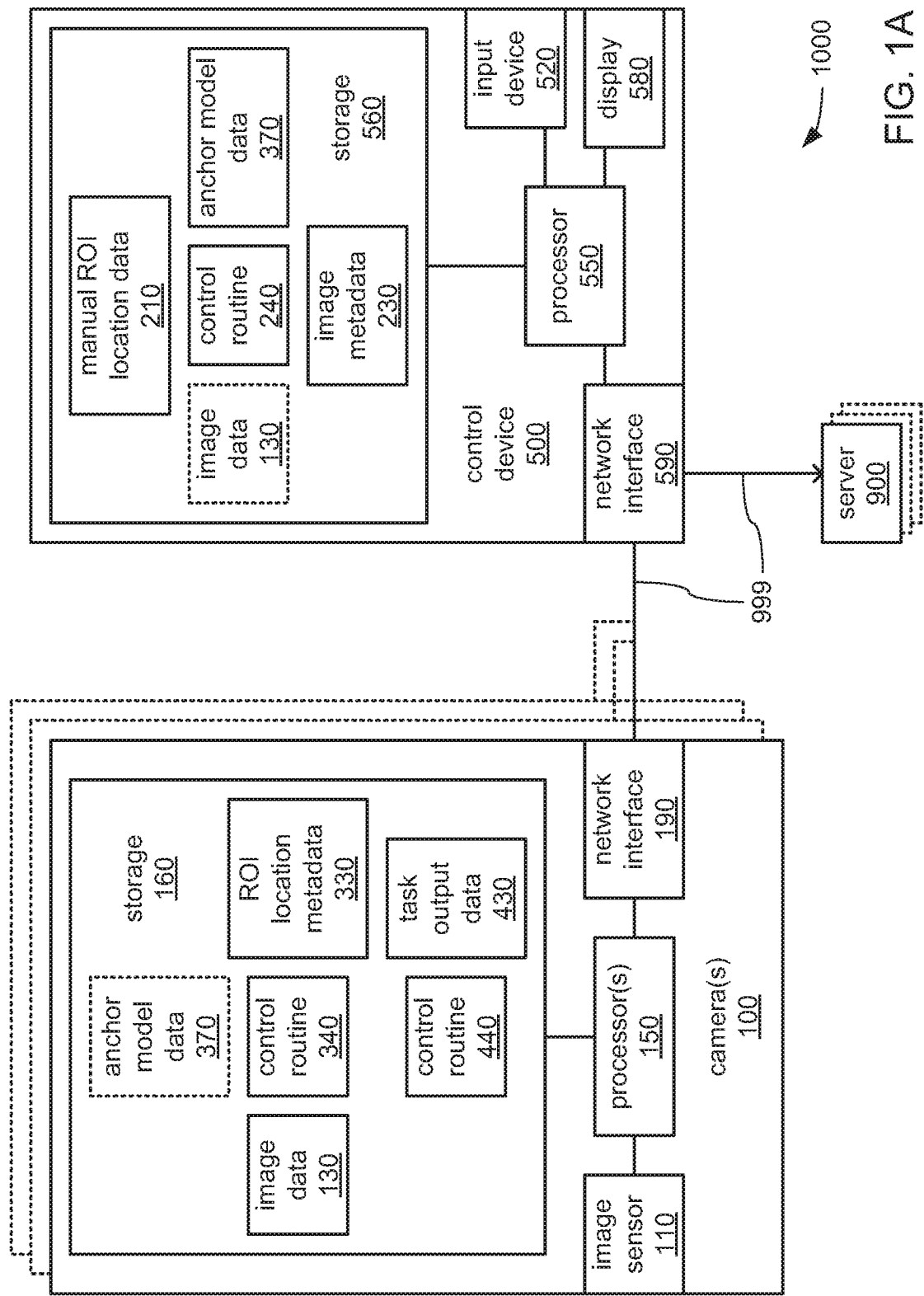
FIGS. 1A and 1B show aspects of alternate example implementations of a machine vision system.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is a machine vision system that is trainable, without the need of skilled personnel, to identify and use anchor in images to identify a corresponding ROI at which a machine vision task is to be performed.

A device includes: an image sensor configured to capture images; storage configured to store image data representing the captured images; and a processor communicatively coupled to at least the storage. The processor is configured, during a training mode, to perform operations including: receive a set of training images captured by the image sensor, wherein each captured training image of the set of captured training images includes multiple visual features and a region of interest (ROI); receive manually input indications of a location of the ROI within each captured training image of the set of captured training images; perform at least one of a rotational transform, a translational transform, a scaling transform or a shear transform on the multiple visual features and ROI of at least one captured training image of the set of captured training images to at least partially align the multiple visual features and ROIs among all of the captured training images of the set of captured training images to identify a common set of visual features that are present within all of the captured training images; derive a converged ROI based on at least a portion of the ROI of at least one of the captured training images of the set of captured training images; and generate an anchor model based on a combination of the converged ROI and the common set of visual features, wherein the common set of visual features defines an anchor, a location of each visual feature is specified relative to the converged ROI, and the anchor model is to be used by the processor during an operating mode to derive a location of a candidate ROI relative to the anchor in a captured image.

A machine vision system includes: a camera, wherein the camera includes an image sensor configured to capture images and is configured to use an anchor model, during an operating mode of the machine vision system, to derive a location of a candidate region of interest (ROI) relative to an anchor in a captured image; a manual input device; and a control device communicatively coupled to at least the camera and the input device, and including a processor. The processor is configured, during a training mode of the machine vision system, to perform operations including: receive, from the camera, a set of training images captured by the image sensor, wherein each captured training image of the set of captured training images includes multiple visual features and an ROI; receive, from the input device, manually input indications of a location of the ROI within each captured training image of the set of captured training images; perform at least one of a rotational transform, a translational transform, a scaling transform or a shear transform on the multiple visual features and ROI of at least one captured training image of the set of captured training images to at least partially align the multiple visual features and ROIs among all of the captured training images of the set of captured training images to identify a common set of visual features that are present within all of the captured training images; derive a converged ROI based on at least a portion of the ROI of at least one of the captured training images of the set of captured training images; and generate the anchor model based on a combination of the converged ROI and the common set of visual features, wherein the common set of visual features defines the anchor, and a location of each visual feature is specified relative to the converged ROI.

A method includes, during a training mode, performing operations including: receiving, at a processor and from an image sensor, a set of training images captured by the image sensor, wherein each captured training image of the set of captured training images includes multiple visual features and a region of interest (ROI); receiving, at the processor, manually input indications of a location of the ROI within each captured training image of the set of captured training images; performing, by the processor, at least one of a rotational transform, a translational transform, a scaling transform or a shear transform on the multiple visual features and ROI of at least one captured training image of the set of captured training images to at least partially align the multiple visual features and ROIs among all of the captured training images of the set of captured training images to identify a common set of visual features that are present within all of the captured training images; deriving, by the processor, a converged ROI based on at least a portion of the ROI of at least one of the captured training images of the set of captured training images; and generating, by the processor, an anchor model based on a combination of the converged ROI and the common set of visual features, wherein the common set of visual features defines an anchor, a location of each visual feature is specified relative to the converged ROI, and the anchor model is to be used by the processor during an operating mode to derive a location of a candidate ROI relative to the anchor in a captured image.

Figure 1B:
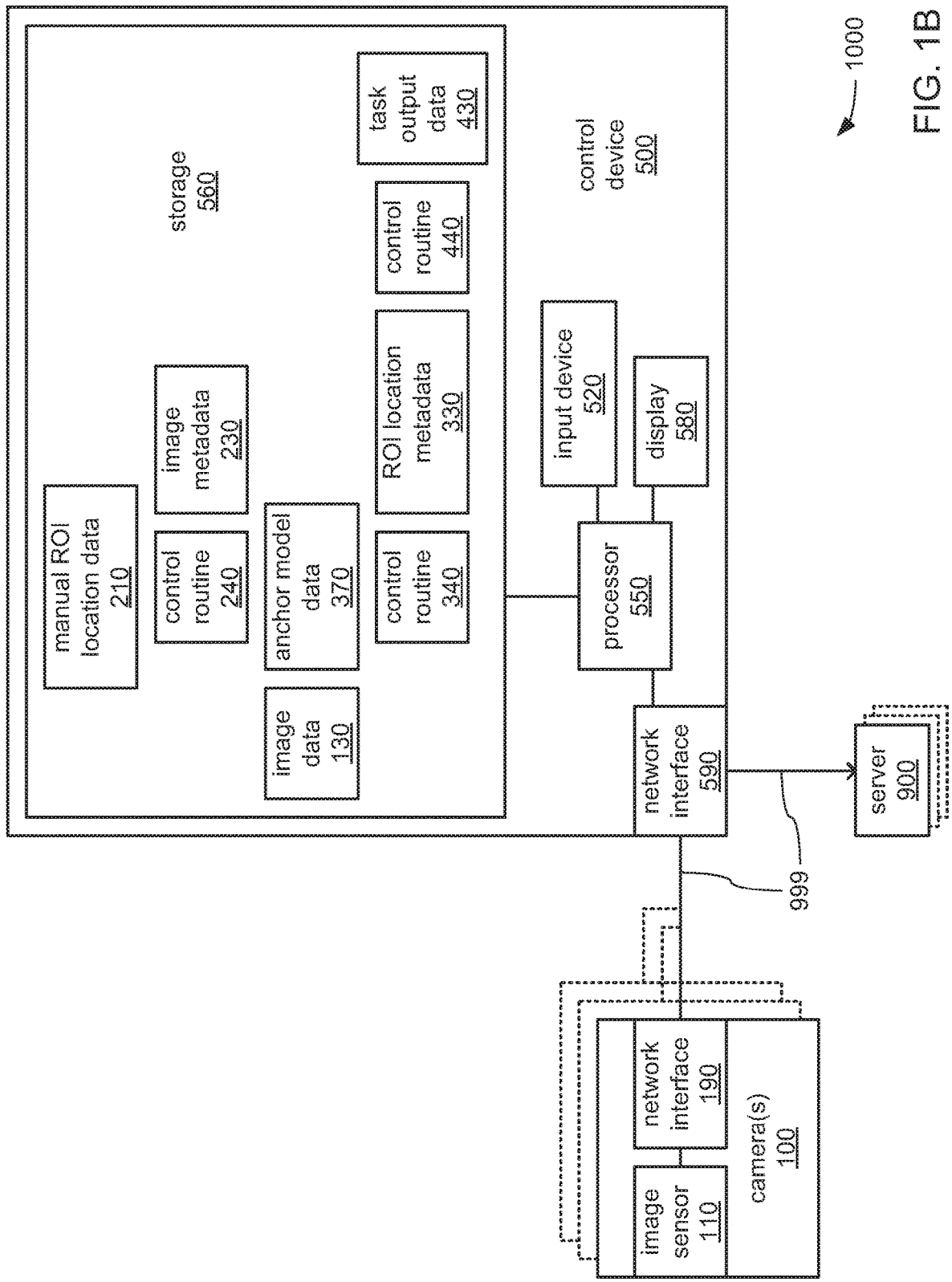

FIGS. 1A and 1B depict aspects of two different example embodiments of a machine vision system 1000 that may include one or more cameras 100 coupled by a network 999 (e.g., cable-based and/or wireless links interconnecting devices) to a control device 500 and/or still another device, such as the depicted one or more servers 900. In the machine vision systems 1000 depicted in each of FIGS. 1A and 1B, and as will be explained in greater detail, each of the one or more cameras 100 may cooperate with the control device 500 through the network 999 to capture images and perform one or more machine vision tasks within one or more ROIs therein during an operating mode. Among such machine vision tasks may be the decoding of an encoded data marking (e.g., one-dimensional or two-dimensional bar codes, watermarks, human-readable text, etc.) to retrieve the encoded data therefrom, the identification of an object, the measuring of a distance, etc. Following the performance of such one or more machine vision tasks, the control device 500 may transmit data associated with such machine vision task(s) to another device, such as one of the one or more servers 900 via the network 999. Additionally, in each of FIGS. 1A and 1B, and as will also be explained in greater detail, each of the one or more cameras 100 may cooperate with the control device 500 through the network 999 to, during a training mode, train the system 1000 to prepare to identify an anchor and to use the anchor to identify an associated ROI in preparation for performing the one or more machine vision tasks during the operating mode.

Turning more specifically to FIG. 1A, each of the one or more cameras 100 may include an image sensor 110, a processor 150, a storage 160, and/or a network interface 190 to provide coupling to the network 999. The processor 150 may incorporate one or more core components, one or more graphics processing unit (GPU) components, and/or one or more single-instruction multiple-data (SIMD) components to provide any of a variety of processing architectures for performing any of a variety of operations. The storage 160 may store one or more of image data 130, ROI location metadata 330, a control routine 340, anchor model data 370, task output data 430, and a control routine 440. Within each of the one or more cameras 100, the image sensor 110, the storage 160 and/or the network interface 190 may each be communicatively coupled to the processor 150 to exchange data therewith through the exchange of electrical, optical, magnetic and/or other signals through one or more buses and/or other form of interconnect.

The control device 500 may include a processor 550, a storage 560, an input device 520, a display 580, and/or a network interface 590 to couple the control device 500 to the network 999. The processor 550 may incorporate one or more core components, one or more graphics processing unit (GPU) components, and/or one or more single-instruction multiple-data (SIMD) components to provide any of a variety of processing architectures for performing any of a variety of operations. The storage 560 may store one or more of the image data 130, manual ROI location data 210, image metadata 230, a control routine 240, and the anchor model data 370. Within the control device 500, the storage 560, the input device 520, the display 580 and/or the network interface 590 may each be communicatively coupled to the processor 550 to exchange data therewith through the exchange of electrical, optical, magnetic and/or other signals through one or more buses and/or other form of interconnect.

Each of the control routines 240, 340 and 440 may incorporate a sequence of instructions operative on corresponding ones of the processors 150 and 550 to implement logic to perform various functions. As will be explained in greater detail, in different embodiments, such as the differing embodiments depicted in FIGS. 1A and 1B, different ones of the processors 150 and 550 may be employed in executing different portions of, and/or different ones of, the control routines 240, 340 and 440 to perform different ones of those various functions.

Turning again more specifically to FIG. 1A, during the operating mode of the machine vision system 1000 and within each of the one or more cameras 100, in executing the control routine 340, the processor 150 may be caused to operate the image sensor 110 to recurringly capture images of whatever object may be within the FOV thereof, and may at least temporarily store representations of those captured images within the storage 160 as the image data 130. In some embodiments, the processor 150 may incorporate, or be otherwise accompanied by, a direct memory access (DMA) component (not specifically shown) that may be more capable of more efficiently transferring the data representing images captured by the image sensor 110 from the image sensor and into the storage 160 as the image data 130.

The processor 150 may then be further caused by the control routine 340 to analyze each of the captured images within the image data 130 to search for and detect the presence of an anchor fitting an anchor model described within the anchor model data 370. Upon detecting the presence of the anchor, the processor 150 may be caused to use the position and/or orientation of the anchor within the image to derive the location of an associated ROI at which one or more machine vision tasks are to be performed based on an indication within the anchor model data 370 of where the ROI should be relative to the anchor. The processor 150 may then be caused to at least temporarily store an indication of the location of that ROI within the image as the ROI location metadata 330.

In executing the control routine 440, and in response to the derivation of the location of the associated ROI, the processor 150 may be caused by the control routine 440 to employ the indication of the location of that ROI to at least attempt to perform one or more machine vision tasks within that ROI at the location specified in the ROI location metadata 330. Regardless of what one or more machine vision tasks are performed thereat, the processor 150 may at least temporarily store the results of the performance(s) of the one or more machine vision tasks as the task output data 430, and to operate the network interface 190 to transmit, via the network 999 and to the control device 500, at least a portion of the task output data 430.

Also during the operating mode and within the control device 500, the processor 550 may be caused to operate the network interface 590 to receive, via the network, the portions of the task output data 430 that are transmitted to the control device 500 by each of the one or more cameras 100. The processor 550 may further operate the network interface 590 to relay such portions of the task output data 430 onward to another device (e.g., the one or more servers 900) via the network 999.

As will be explained in greater detail, the operating mode of the machine vision system 1000 just briefly described may follow the training mode of the machine vision system 1000 in which the decoding system 1000 is trained to detect the anchor defined by the anchor model data 370. More specifically, during the training mode and in executing the control routine 240, the processor 550 of the control device 500 may be caused to cooperate with the one or more cameras 100 to capture a set of training images. The processor 550 may operate the network interface 590 to receive the captured training images from the one or more cameras 100, and may temporarily store the captured training images as at least a portion of the image data 130 within the storage 560. Each of the captured training images may contain an example, selected by an operator of the machine vision system 1000, of an ROI in which one or more particular machine vision tasks is to be performed.

Either as the set of training images is being captured or following the capturing of the set of captured training images, the processor 550 may be caused by the control routine 240 to select one of the training images to serve as a reference image. Also, as the set of training images is being captured or following the capturing of the set of captured training images, the processor 550 may also be caused to operate the input device 520 and the display 580 to provide a user interface (UI) by which the operator is prompted to manually specify the portion of each captured training image that falls within the ROI. In some embodiments, for each captured training image, the operator may be caused to use the input device 520 and/or the display 580 to draw, or otherwise provide manual input indicating the position of, a rectangular boundary of the ROI within the captured training image. Regardless of the exact manner in which the operator is caused to provide such a manual indication of the location and/or orientation of the ROI for each captured training image as an input, and regardless of the exact geometric shape of the ROI within each captured training image, the processor 550 may be caused to temporarily store indications of the size, shape, position and/or orientation of each such ROI for each such captured training image as the manual ROI location data 210.

Following the capturing of the training images and the manual provision of the indications of the ROI within each, the processor 550 may be caused by the control routine 240 to analyze each of the training images to identify each instance of one or more features (e.g., segments, angles, specific geometric shapes, etc.) and to generate metadata for each training image that is descriptive of such instances of features. The processor 550 may then at least temporarily store indications of the features identified in each of the captured training images as the image metadata 230. Then, for each captured training image other than the one designated as the reference image, the processor 550 may then test various rotational, translational, scaling and/or shear transforms on the features and ROI indicated in the image metadata 230 and the manual ROI location data as being present therein to the to align those features and that ROI to the features and ROI, respectively, that are indicated as present in the reference image. In so doing, the processor 550 may, for each captured training image other than the one designated as the reference image, derive a transform (which may incorporate rotational, translational, scaling and/or shear components) that achieves the best alignment of features and ROI therein with the features and ROI, respectively, within the reference image.

Following the derivation of such a transform for the features and ROI of each captured training image other than the reference image, the processor 550 may be caused to compare the features within the reference image to the features within each of the other training images, with its corresponding derived transform applied thereto, to identify a set of the features that are found to be common to all of the reference image and the other captured training images. The processor 550 may then be caused to store indications of that set of features in the anchor model data 370 as part of the definition of the anchor model.

Also following the derivation of such a transform for the features and ROI of each captured training image other than the reference image, the processor 550 may be caused to compare the shape, size and/or location of the ROI of the reference image to the shape, size and/or location of the ROI within each of the other training images, again with its corresponding derived transform applied thereto, to derive a definition of the shape, size and/or location of a singled converged ROI relative to the set of features of the anchor model. The processor 550 may then be caused to store indications of the shape, size and/or location of the converged ROI in the anchor model data 370 as another part of the definition of the anchor model.

Turning more specifically to FIG. 1B, the embodiment of the machine vision system 1000 of FIG. 1B may be substantially similar to the decoding system 1000 of FIG. 1A. However, a substantial difference therebetween may be that, in the embodiment of the decoding system 1000 of FIG. 1B, the processor 550 of the control device 500 may execute the control routines 340 and/or 440, instead of the processor 150 of each of the one or more cameras 100 doing so. Thus, during the operating mode, the processor 550 within the control device 500 may be provided with the ability to detect the anchor marking defined within the anchor model data 370 within each captured image, use the anchor model described in the anchor model data 370 to derive the location of the corresponding ROI therein, and perform one or more machine vision tasks within each such ROI, all in lieu of the processor(s) 150 of the one or more cameras 100 doing so.

It should be noted that, despite the depiction in FIGS. 1A and 1B of two different specific embodiments of the decoding system 1000 in which various functions are depicted and discussed as being split between the one or more cameras 100 and the control device 500, other embodiments are possible in which each camera 100 of the one or more cameras 100 may incorporate the functionality of both the camera 100 and the control device 500. Thus, in such other embodiments, each camera 100 of the one or more cameras 100 may, independently of each other, perform the detection of the anchor, the derivation of the location of the corresponding ROI, the one or more machine vision tasks within the ROI, and the transmission of data resulting from the performances of the one or more machine vision tasks to one or more other devices (e.g., the one or more of the servers 900).

Referring now to both FIGS. 1A and 1B, the image sensor 110 within each of the one or more scanning devices 100 may be based on any of a variety of technologies and may employ any of a variety of optical scanning and/or other image capturing techniques to capture an image of encoded data markings (e.g., indicia, digital watermarks and/or text) carried by a portion of an object. More specifically, the image sensor 110 may include any of a variety of light sensing components to effect the capture of an image that may include encoded data markings, including and not limited to, a charge-coupled device (CCD) or complementary metal-oxide-semiconductor (CMOS) sensor providing a single row of individual light sensors operated in a manner that sweeps over encoded data markings to perform a scan thereof, or a CCD or CMOS sensor providing a two-dimensional (2D) array of individual light sensors to capture a 2D image of one or more encoded data markings.

In some embodiments, the image sensor 110 may additionally incorporate, or be otherwise accompanied by, any of a variety of optical components (e.g., lenses, mirrors, color-adjusting gels, etc.—not specifically shown) that may manipulate the light arriving at the image sensor 110 from within the FOV of the image sensor 110 in any of a variety of ways before it reaches the light sensing components of the image sensor 110. Alternatively or additionally, the image sensor 110 may additionally incorporate, or be otherwise accompanied by, any of a variety of illumination components (e.g., broad spectrum light sources, single frequency light sources, collimated light sources, etc.—not specifically shown) that may serve to illuminate a surface of an object within the FOV in a manner that enhances the ability of the image sensor 110 to capture an image of a portion of that surface of that object.

In embodiments in which the one or more machine vision tasks include the decoding of encoded data markings, the objects onto which the encoded data markings are carried may each be any of a variety of objects, including and not limited to, a package carrying a shipping label that includes encoded data marking(s), or a product for sale within retail packaging on which encoded data marking(s) are printed as part of the graphical artwork thereof. The data encoded within such encoded data markings may include, and not be limited to, data indicating the addresses of a sender and/or intended recipient of a package, or data providing a universal product code (UPC) that uniquely identifies a product for sale. Each encoded data marking that is implemented as an indicia may be any of a variety of forms of 1D optically readable indicia (e.g., a barcode) or 2D optically readable indicia (e.g., a QR code), including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; Post-Bar; POSTNET; RM4SCC/KIX; Telepen; UPC; Aztec Code; Code 1; ColorCode; Color Construct Code; Cronto-Sign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; and SPARQCode.

Each of the storages 160 and 560 may be based on any of a variety of volatile storage technologies, including and are not limited to, random-access memory (RAM), dynamic RAM (DRAM), Double-Data-Rate DRAM (DDR-DRAM), synchronous DRAM (SDRAM), static RAM (SRAM), etc. Alternatively or additionally, the storage 360 may be based on any of a variety of non-volatile storage technologies.

Each of the processors 150 and 550 may include any of a wide variety of processors, microcontrollers, gate-array logic devices, etc. that may be incorporate any of a variety of features to enhance speed and/or efficiency of processing operations. Such features may include and are not limited to, multi-threading support per core component, multiple processing core components, directly integrated memory control functionality, and/or various modes of operation by which speed of throughput and/or level of power consumption may be dynamically altered.

Each of the processors 150 and 550 may be implemented as a single semiconductor die within a single package. Alternatively, each processor 350 may be implemented as multiple semiconductor dies incorporated into a single package, such as a multi-chip semiconductor package (e.g., a system-on-a-chip, or SOC) in which the multiple semiconductor dies may be interconnected in any of a variety of ways, including and not limited to, conductive wires extending between adjacent semiconductor dies, and/or a substrate formed from multiple layers of conductors separated by intervening layers of insulating material (e.g., a printed circuit board, or PCB) onto which the multiple semiconductor dies may be soldered.

Each of the network interfaces 190 and 590 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, each of the network interfaces 190 and 590 may be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2:
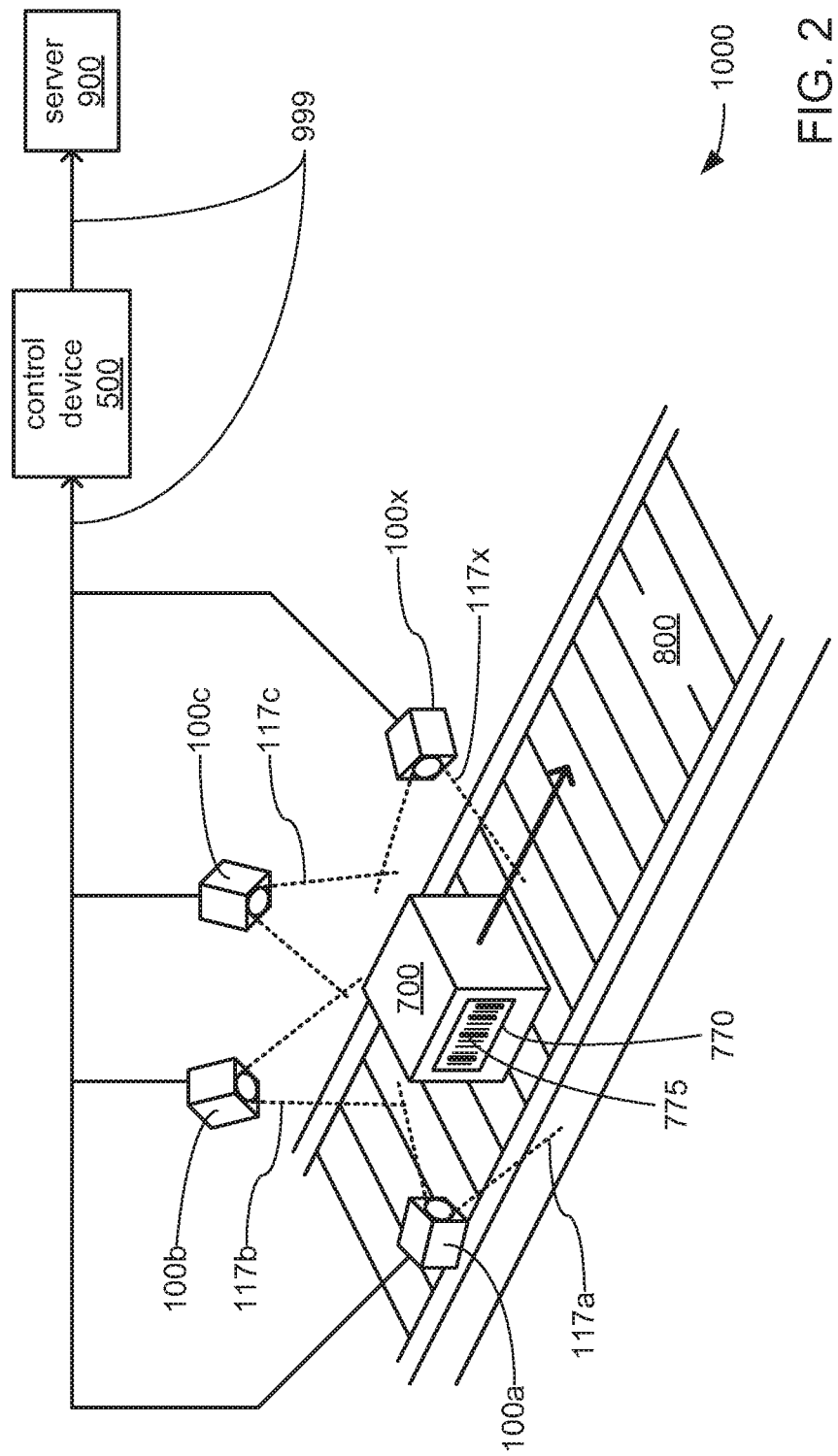
FIG. 2 shows aspects of an example use of the machine vision system of either FIG. 1A or 1B.

FIG. 2 depicts aspects of an example implementation of the machine vision system 1000 of either of FIG. 1A or 1B in capturing images, identifying ROIs and performing one or more machine vision tasks within those ROIs. The depicted example implementation of the machine vision system 1000 may be used to identify and decode encoded data markings 775 that may be applied to a label or portion 770 of a surface of an object 700 in the form of a package moved along the path of a conveyor belt 800. More specifically, FIG. 2 provides a combination of perspective view and block diagram of an example implementation of the machine vision system 1000 that includes at least four cameras 100a, 100b, 100c and 100x positioned in a manner that surrounds a location along the path of the conveyor belt 800, which becomes the path along which the object 700 is moved. It should be noted that this depiction of this example use of this example implementation of the machine vision system 1000 is but one possible example provided herein for purposes of illustration, and should not be taken as limiting. Stated differently, other uses of other implementations of the machine vision system 1000 are possible in which the object 700 may be any of a variety of objects other than a package moved along a conveyor belt, in which a different quantity of the cameras 100a-x may be used, and/or in which each of the cameras 100a-x may be mounted as a set to a vehicle such that it is the cameras 100a-x of the machine vision system 1000 that are moved relative to the object 700, instead of the object 700 being moved relative to the cameras 100a-x.

As depicted, the at least four cameras 100a-x are positioned to cause at least a portion of a location along the conveyor 800 to be placed within each of the FOVs 117a-x of the image sensor 110 within each of the cameras 100a-x, respectively. As also depicted, two or more of the FOVs 117a-x may overlap. However, it should be noted that other embodiments are possible in which none of the FOVs 117a-x overlap. Indeed, other embodiments are possible in which two or more of the cameras 100a-x may be positioned to place entirely different locations along the path of the conveyor belt 800 within their respective ones of the FOVs 117a-x. Stated differently, the at least four cameras 100a-x may be positioned to cover a single location along the conveyor 800 such that each is able to capture an image of a different portion of the object 700 simultaneously as the object 700 moves along the path of the conveyor belt 800, or the at least four cameras 100a-x may be positioned to cover different locations along the path of the conveyor belt 800 such that each is able to capture an image of a different portion of the object 700 as the object 700 moves through their separate ones of the FOVs 117a-x at different times.

Regardless of the manner in which the at least four cameras 100a-x are positioned relative to one or more locations along the path of the conveyor belt 800, and as previously discussed, each of the at least four cameras 100a-x may be communicatively coupled to the control device 500 through the network 999, and may cooperate with the control device 500 through the network 999 to identify an ROI within each of multiple captured images, and to perform one or more machine vision tasks that may include decoding one or more encoded data markings 775 within such ROIs. Further, following such decoding, the resulting decoded data may be transmitted by the control device 500 to another device via the network 999, such as the depicted server 900.

Figure 3A:
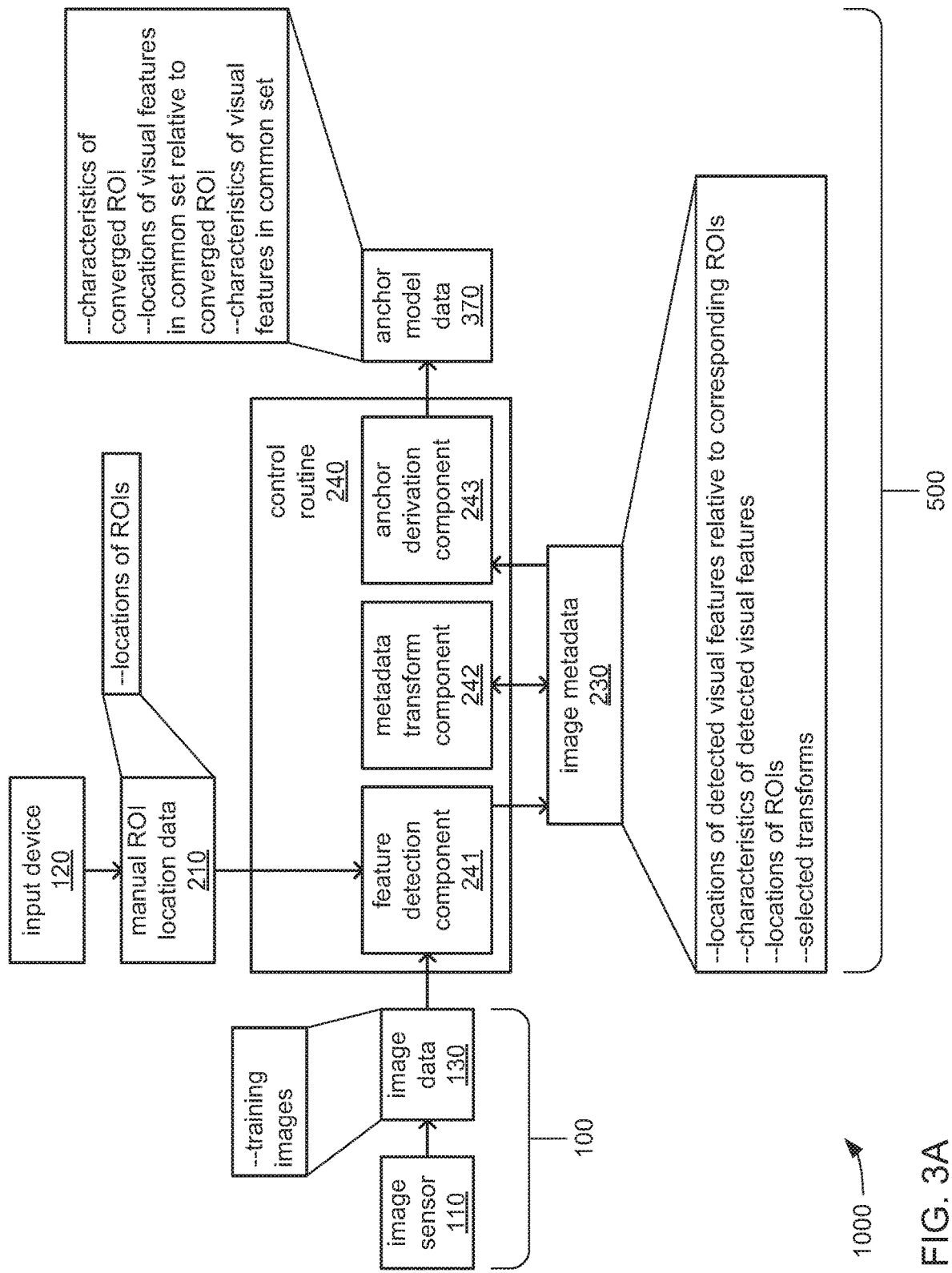

FIGS. 3A and 3B, together, depict aspects of an example embodiment of an internal architecture of the machine vision system 1000. More specifically, FIG. 3A depicts aspects of an example portion of an internal architecture employed in the training mode to train the machine vision system 1000 to identify an anchor as part of identifying a corresponding ROI. FIG. 3B depicts aspects of an example portion of an internal architecture employed in the operating mode, in which the anchor is employed to derive the location of a corresponding ROI within which one or more machine vision tasks are to be performed. As previously discussed, different ones of the control routines 240, 340 and 440 may be executed by different ones of the processor(s) 150 of the one or more cameras 100 and the processor 550 of the control device 500. As depicted, each of the control routines 240, 340 and 440 may incorporate one or more distinct components that each include executable instructions that cause a processor to perform one or more distinct functions when executed.

Turning more specifically to FIG. 3A, the control routine 240 may include a feature detection component 241 that may cause a processor (e.g., the processor 550 within the control device 500) to analyze each of multiple captured training images in a set of captured training images to identify each instance of one or more pre-selected visual features (e.g., line segments), and to store indications of characteristics and/or locations of those detected visual features as part of the image metadata 230. Additionally, the processor may be caused to receive the manual ROI location data 210 specifying the locations (e.g., the shape, size, orientation, position, etc.) of the ROI within each of the captured training images (as manually entered by an operator, as discussed earlier), and to incorporate those indications of locations of ROIs into the image metadata 230 alongside the indications of characteristics and/or locations of the detected visual features stored therein. Also additionally, the processor may be caused to designate one of the captured training images as a "reference image" in preparation for subsequent operations in the training mode.

Alternatively or additionally, the control routine 240 may include a metadata transform component 242 to cause a processor (e.g., the processor 550 within the control device 500) to, for each of captured training image other than the one designated as the reference image, test each transform of multiple transforms on the locations of the detected visual features and the ROI indicated in the image metadata 230 to determine which transform provides the greatest degree of alignment of the detected visual features and the ROI of each such captured training image with the detected visual features and the ROI of the reference image. As a result of such testing, the processor may be caused to select, for each captured training image other than the one designated as the reference image, the transform of the multiple transforms that are tested that results in the alignment of the greatest number of detected visual features thereof with the detected visual features of the reference image. The processor may then store indications of the selected transform for each captured training image (other than the one designated as the reference image) in the image metadata 230.

Also alternatively or additionally, the control routine 240 may include an anchor derivation component 243 that may cause a processor (e.g., the processor 550) to, for each captured training image other than the one designated as the reference image, compare the alignment of detected visual features (with the corresponding selected transform applied) with the detected visual features of the reference image to identify a common set of detected visual features that are found to be present at similar locations relative to the ROI in all of the captured training images (including the reference image). Additionally, the processor may be caused to, for each captured training image other than the one designated as the reference image, compare the alignment of the ROI (again, with the corresponding selected transform applied) with the ROI of the reference image to derive a shape, size, orientation and/or position of a converged ROI from the varying shapes and/or sizes of the ROIs that were manually provided for all of the captured training images (including the reference image). The processor may then be caused to store indications of the characteristics and/or location of the converged ROI as part of the anchor model data 370. The processor may also be caused to store indications of the characteristics and/or locations (relative to the converged ROI) of each of the detected visual features within the common set of detected visual features in the anchor model data 370 as part of a definition for an anchor model that is to be used during the operating mode.

Turning more specifically to FIG. 3B, the control routine 340 may include an anchor detection component 341 that may cause a processor (e.g., either the processor 150 within each of the one or more cameras 100 or the processor 550 within the control device 500) to analyze each image that is captured by the image sensor 110 thereof during the operating mode to attempt to detect, therein, the anchor for which the decoding system 1000 was trained during the training mode. More specifically, the processor may be caused to use information within the anchor model data 370 concerning the visual features that make up the anchor marking to determine whether the anchor marking is within each such captured image, and/or at what location therein.

Alternatively or additionally, the control routine 340 may include an ROI derivation component 342 that may cause a processor (e.g., either the processor 150 within each of the one or more cameras 100 or the processor 550 within the control device 500), in response to the successful detection of the anchor marking within an image captured during the operating mode, to use the anchor model defined in the anchor model data 370 to derive the shape, size and/or location of a corresponding candidate ROI within the captured image. The processor may be further caused to store an indication of the characteristics and/or location of the corresponding candidate ROI within the ROI location metadata 330.

Continuing with FIG. 3B, the control routine 440 may include a task component 441 that may cause a processor (e.g., either the processor 100 within each of the one or more cameras 100 or the processor 550 within the control device 500) to perform one or more pre-selected machine vision tasks within each candidate ROI indicated in the ROI location metadata 330 as being present within a captured image. As previously discussed, the one or more machine vision tasks may include any of a variety of machine vision tasks. In so performing the one or more machine vision tasks, the processor may at least temporarily store data generated thereby as part of the task output data 430 for subsequent transmission to another device (e.g., one of the servers 900).

As previously discussed, in differing embodiments, at least the control routines 340 and/or 440 may be executed by either the processor(s) 150 of the one or more cameras 100, or the processor 550 of the control device 500. However, it should be noted that, despite the specific depictions herein of these two particular possibilities for the allocation of performance of functions among multiple processors and/or devices, still other embodiments of the decoding system 1000 are possible with still other allocations of functions among one or more processors and/or among one or more devices, including embodiments in which the processor 150 of at least one camera 100 may execute the executable instructions of all of the control routines 240, 340 and 440, and thereby perform all of the functions associated therewith.

FIGS. 4A, 4B, 4C, 4D, 4E and 4F, together, depict aspects of an example of processing operations performed during the training mode of the machine vision system 1000 to derive an anchor 772 from a common set of visual features that are found to be present in all captured training images 880 within a set thereof. The anchor 772 may then later be used by the machine vision system 1000, during its operating mode, to derive the location, within a captured image, of a candidate ROI 777 within which one or more machine vision tasks are to be performed.

Figure 4A:
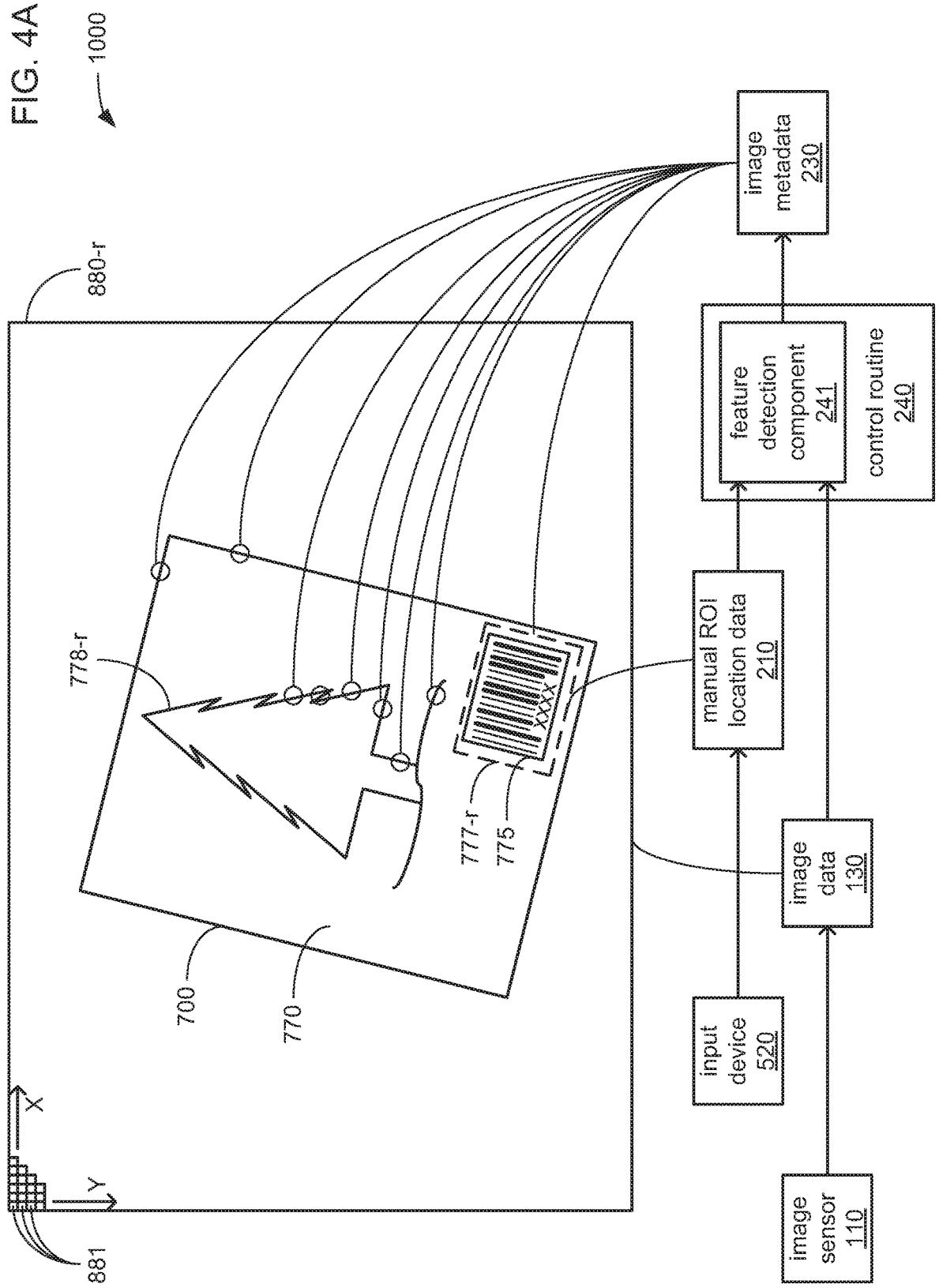
FIGS. 4A, 4B, 4C, 4D, 4E and 4F, together, show aspects of deriving an anchor model for use in identifying anchors for use in deriving locations of ROIs at which machine vision task(s) are to be performed during an operating mode of the machine vision system of either FIG. 1A or 1B.

FIG. 4A presents an example of one of multiple captured training images 880 that may be designated as a reference image 880-*r* for purposes of various processing operations that will later be described in reference to subsequent figures. This example captured training image 880-*r* may include an image of a rectilinear object 700, such as a box, having a surface 770 onto which planted tree scenery 778 and an encoded data marking 775 (specifically, a 1D barcode, as depicted—although a 2D barcode, a watermark and/or a portion of human-readable text are possible) have been printed or are otherwise carried thereon. This example captured training image 880-*r* may have been captured by one of the cameras 100*a*-*x* positioned along the conveyor belt 800 in the exemplary use of an exemplary implementation of the machine vision system 1000 earlier depicted in FIG. 2. As will be explained in greater detail, during the training mode, the machine vision system 1000 may be trained to identify and use an anchor 772 as part of locating a candidate ROI 777 in which the encoded data marking 775 is expected to be found, and within which the one or more machine vision tasks to be performed may include the decoding of the encoded data marking 775.

It should be noted that what is depicted in FIG. 4A is a deliberately highly simplified example of an image having relatively few visual features. This highly simplified example is presented herein as an aide for the sake of discussion to facilitate understanding, and should not be taken as being in any way limiting of the type and/or complexity of the images that are contemplated as being captured and used by other envisioned implementations of the machine vision system 1000 in both training and operating modes.

With the decoding system 1000 placed in the training mode, an image sensor 110 of a camera 100 may be operated to capture a set of training images 880 that includes the depicted captured training image 880-*r*, where each such captured training image 880 (including the depicted captured training image and reference image 880-*r*) is of a different example of the rectilinear object 700 having the surface 770 on which is carried a planted tree scenery 778 and an encoded data marking 775. As previously discussed, the set of captured training images 880 may be at least temporarily stored as the image data 130.

In addition to the operation of the depicted image sensor 110 to capture the set of training images 880, and as previously discussed, at least the input device 520 (if not also the display 580) of the control device 500 may be operated to provide a UI by which an operator of the machine vision system 1000 may manually provide, for each of the captured training images 880 (including the depicted captured training image and reference image 880-*r*), an indication of the size, shape, position and/or orientation of the ROI 777 therein (including the depicted ROI 777-*r* of the captured training image and reference image 880-*r*). Such manually provided indications of the location of the ROI 777 within each of the captured training image 880 (including the ROI 777-*r* of the captured training image and reference image 880-*r*) may be at least temporarily stored within the manual ROI location data 210.

It should be noted that, following the storage of the set of captured training images 880 within at least a portion of the image data 130, and following the storage of the manually input indications of where an ROI 777 is located within each of the captured training images 880 within the manual ROI location data 210, the image data 130 and the manual ROI location data 210 may be stored together in some embodiments as training data for future use in training the machine vision system 1000 in situations where the machine vision system 1000 is not to be trained until a later time. However, regardless of when the training of the machine vision system 1000 is to take place, at that time, such training data stored as the image data 130 and the manual ROI location data 210 may then be provided as inputs to the feature detection component 241.

The processor 550 may then be caused by execution of the instructions of the feature detection component 241 to analyze the captured training image 880-*r* to detect each instance of one or more pre-selected visual features. In various embodiments, the pre-selected visual features may include edges, corners, pre-selected geometric shapes, 2D regions of pixels that are colored alike, etc. However, in some embodiments, it may be that the sole type of visual feature that the processor 550 is caused to search for and detect is a line segment. As will be familiar to those skilled in the art, line segments in captured images may represent edges of physical objects, or may represent boundaries between adjacent regions of pixels that are of different colors and/or different levels of brightness. Thus, for example, and as depicted in FIG. 4A, among the line segments that may be so detected in the depicted captured training image 880-*r* may be line segments at the depicted edges of the surface 770. Also among the line segments that may be so detected may be line segments within the planted tree scenery 778, such as line segments at the boundaries between the greenery of the planted tree and the surrounding background, line segments at the boundaries between the tree trunk of the planted tree and the ground, and/or line segments at the boundaries between the ground and the background.

Indications of the locations and/or various characteristics of such detected line segments in the captured training image 880-*r* may be stored as a portion of the image metadata 230 that corresponds to the captured training image 880-*r*. Again, the location of each such detected line segment may be indicated as relative to a pre-selected portion of the ROI 777-*r* that is indicated in the manual ROI location data 210 as being present within the captured training image 880-*r* (i.e., a pre-selected corner of that ROI 777-*r*). The characteristics of each such line segment for which indications may be so stored, may include, and not be limited to, line segment length, the colors of the pixels on opposite sides of each line segment, and/or the level of brightness on opposite sides of each line segment. Additionally, indications of the location and/or various characteristics of the ROI 777-*r* (e.g., shape, size, orientation, etc.) that is indicated as present within the captured training image 880-*r* may also be stored within the image metadata 230.

Figure 4B:
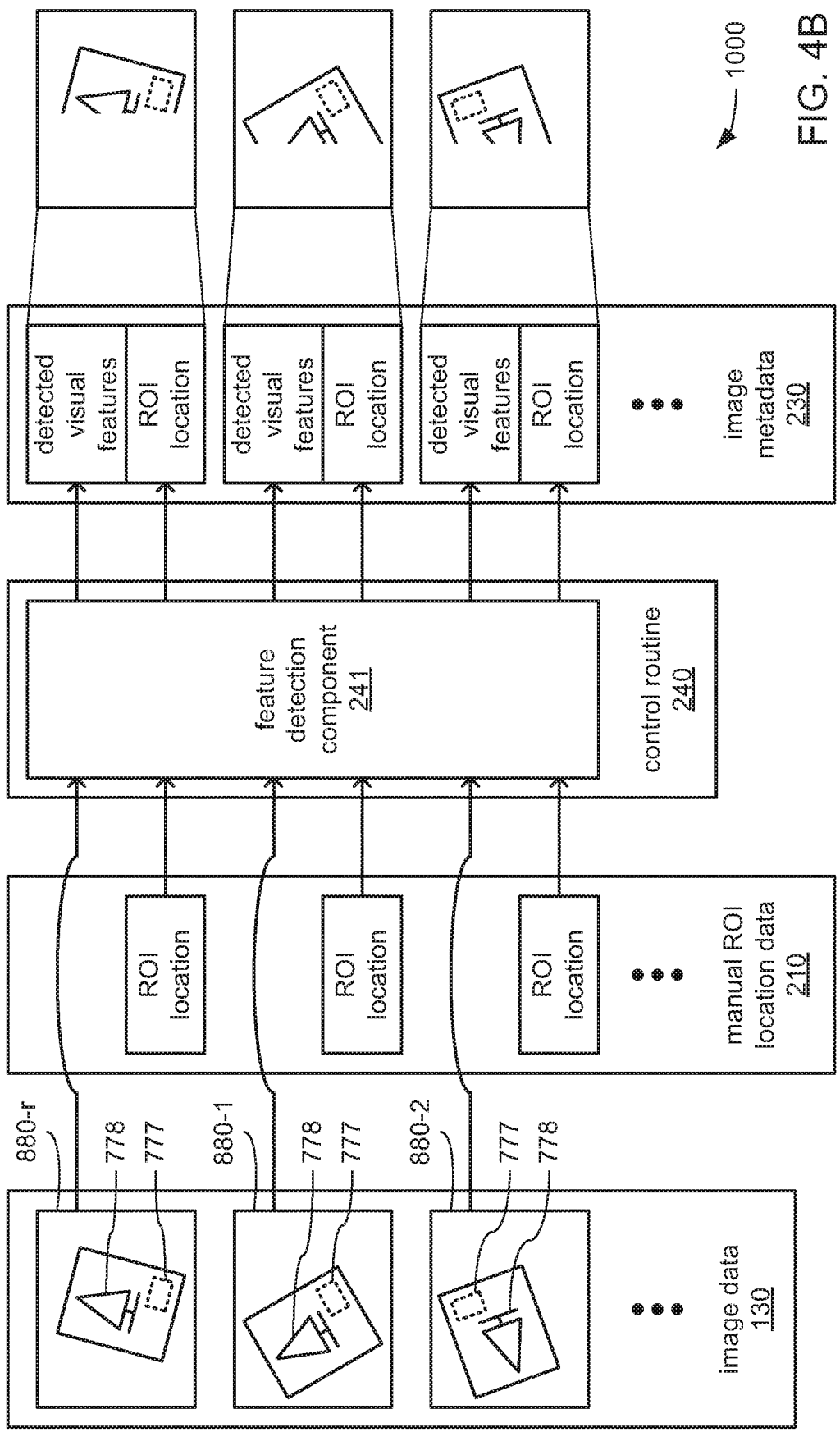

Turning to FIG. 4B, processing operations similar to what has just been described in reference to FIG. 4A as being performed on the captured training image and reference image 880-*r* depicted therein may also be performed by the processor 550 on each of the other captured training images 880 within a set of training images that includes the captured training image and reference image 880-*r*, and that also includes the specifically depicted captured training images 880-1 and 880-2. As those skilled in the art of machine vision will readily recognize, the successful detection of visual features in captured images may be limited by a number of factors, including and not limited to, limitations of the image sensor used (e.g., resolution, light sensitivity, the range of frequencies of light able to be detected, etc.), aspects of the manner in which objects are illuminated (e.g., color temperature of the lighting, light levels, reflections, etc.), and/or limitations of the manner in which image data is stored (e.g., type of color encoding used, range of grayscale values available for each color component, etc.).

Thus, and as depicted for this highly simplified example, it may be that the visual features (e.g., line segments) of differing portions of objects 700 within different ones of each of the captured image 880-*r*, 880-1 and 880-2 are able to be detected such that they are included among the indications of detected visual features that are caused to be stored by the processor 550 within the image metadata 230. Additionally, the processor 550 may also be caused to retrieve the manually provided indications of the location and/or characteristics (e.g., shape, size and/or orientation) of the ROI 777 within each of the captured training images 880 (including of the ROI 777-*r* within the captured training image and reference image 880-*r*) from the manual ROI location data 210, and may then store those indications within the image metadata 230.

Figure 4C:
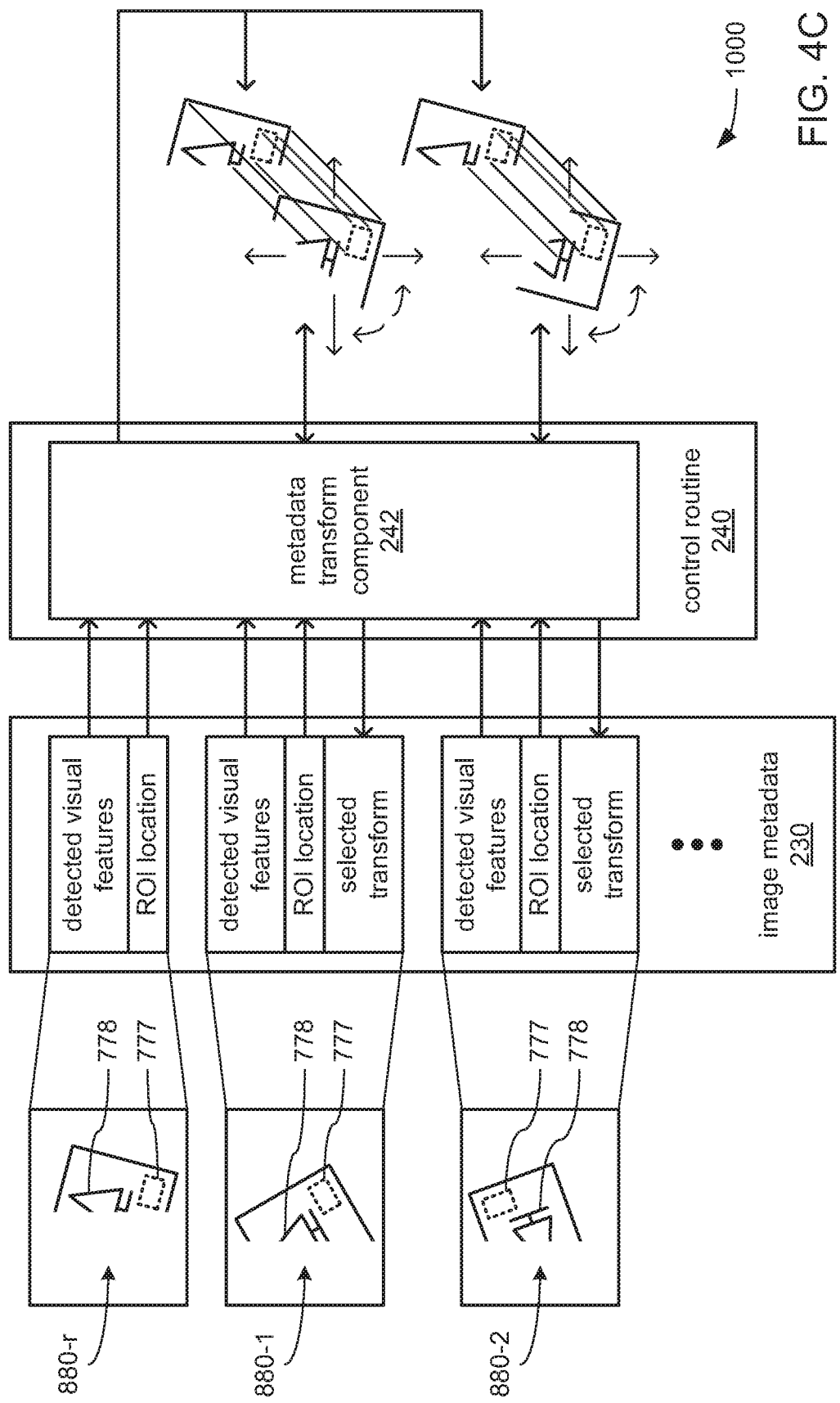

Turning to FIG. 4C, the image metadata 230 may then be provided to the metadata transform component 242. The processor 550 may be caused by the metadata transform component 242 to, for each of captured training image other than the reference image 880-*r* (i.e., for each of the depicted captured training images 880-1 and 880-2, but not for the captured training image 880-*r* that is also designated as the reference image), test each of multiple transforms on the locations of the detected visual features and the ROI 777 thereof indicated in the image metadata 230 to determine which transform provides the greatest degree of alignment of the detected visual features and the ROI 777 of each such captured training image 880 with the detected visual features and the ROI 777-*r* of the reference image 880-*r*. In some embodiments, a pre-selected set of transforms may be tested for each of the captured training images 880 other than the reference image 880-*r* (i.e., for each of the depicted captured training images 880-1 and 880-2). In other embodiments, at least a subset of the transforms may be derived from the results of the testing of others of the transforms as part of an optimizing process such as a shortest-path searching algorithm (e.g., the "A-Star" or "A*" shortest path searching algorithm).

Figure 4D:
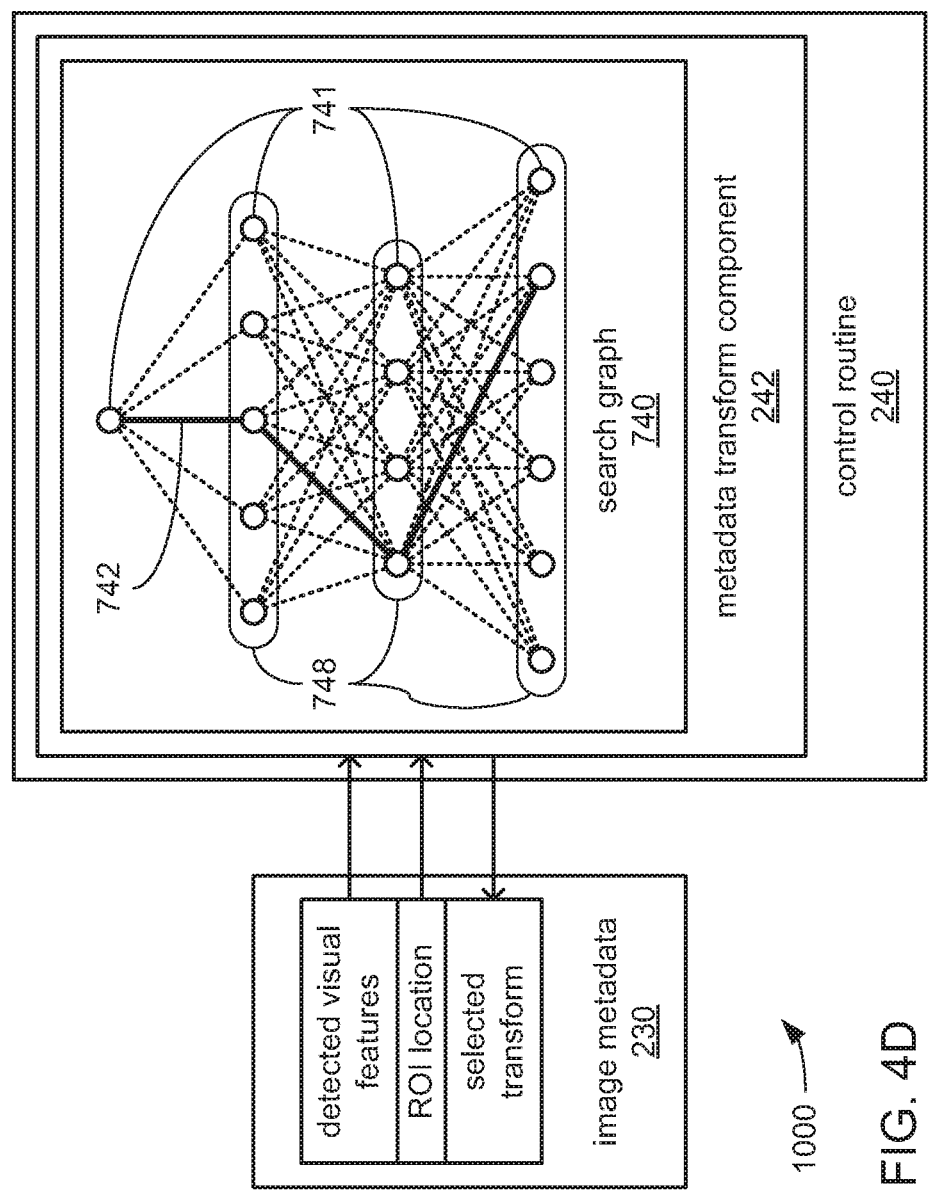

By way of example, and turning briefly to FIG. 4D, the processor 550 may be caused by the metadata transform component 242 to employ any of a variety of graph-based shortest-path searching algorithms in which a data structure analogous to a search graph 740 may be generated and employed. Within such a search graph 740, each layer 748 may correspond to one of the captured training images 880 other than the reference image 880-*r*, and within each such layer 748, each node 741 may correspond to one of the "candidate transforms" with a set of candidate transforms that may be derived for purposes of being considered for the corresponding captured training image 880. Each node 741 within each layer 748 is connected to each node 741 in the next adjacent layer 748. In being caused to search for the shortest path 742 through the layers 748 using any of a variety of graph optimization techniques, the processor 550 may be caused to select, for each of the captured training images 880 other than the reference image 880-*r*, a transform from among the corresponding set of candidate transforms that causes the greatest possible quantity of detected visual features of that captured training image 880 to become aligned with corresponding detected visual features of the reference image 880-*r*.

More specifically, for each one of the captured training images 880 other than the reference image 880-*r* a corresponding set of candidate transforms may be derived. In various embodiments, any of a variety of criteria may be used to limit the number of candidate transforms within each set, such as a requirement that each such transform must cause at least a 3% level of overlap with the visual features of the reference image 880-*r*. The candidate transforms may include any of a variety of rotational, translation, scaling and/or shear transforms, including and not limited to, rigid, similarity, affine and/or perspective transforms.

Regardless of the exact manner in which candidate transforms may be derived, a graph optimization technique may then be used to find, for each captured training image 880 other than the reference image 880-*r*, the optimal transform among the corresponding set of candidate transforms for that captured training image 880. In various embodiments, any of a variety of criteria may be used to define what the optimal transform from among a set of candidate transforms may be. By way of example, out of each set of candidate transforms generated for one of the captured training images 880 (other than the reference image 880-*r*), the optimal transform selected therefrom may be one that, together with the optimal transforms from all of the other sets of candidate transforms, maximizes the cumulative overlapping between the ROI 777-*r* in the reference image 880-*r* and the ROIs 777 of all of the other captured training images 880.

Returning to FIG. 4C, regardless of the source of the transforms that are tested, through such testing, the processor 550 may be caused to select, for each captured training image 880 other than the one designated as the reference image 880-*r* (such as the depicted captured training images 880-1 and 880-2), a transform of the multiple transforms that are tested that results in the alignment of the greatest number of detected visual features of that captured training image 880 with the detected visual features of the reference image 880-*r*. The processor 550 may then store indications of which transform is selected for each captured training image 880 other than the one designated as the reference image 880-*r* in the image metadata 230.

Figure 4E:
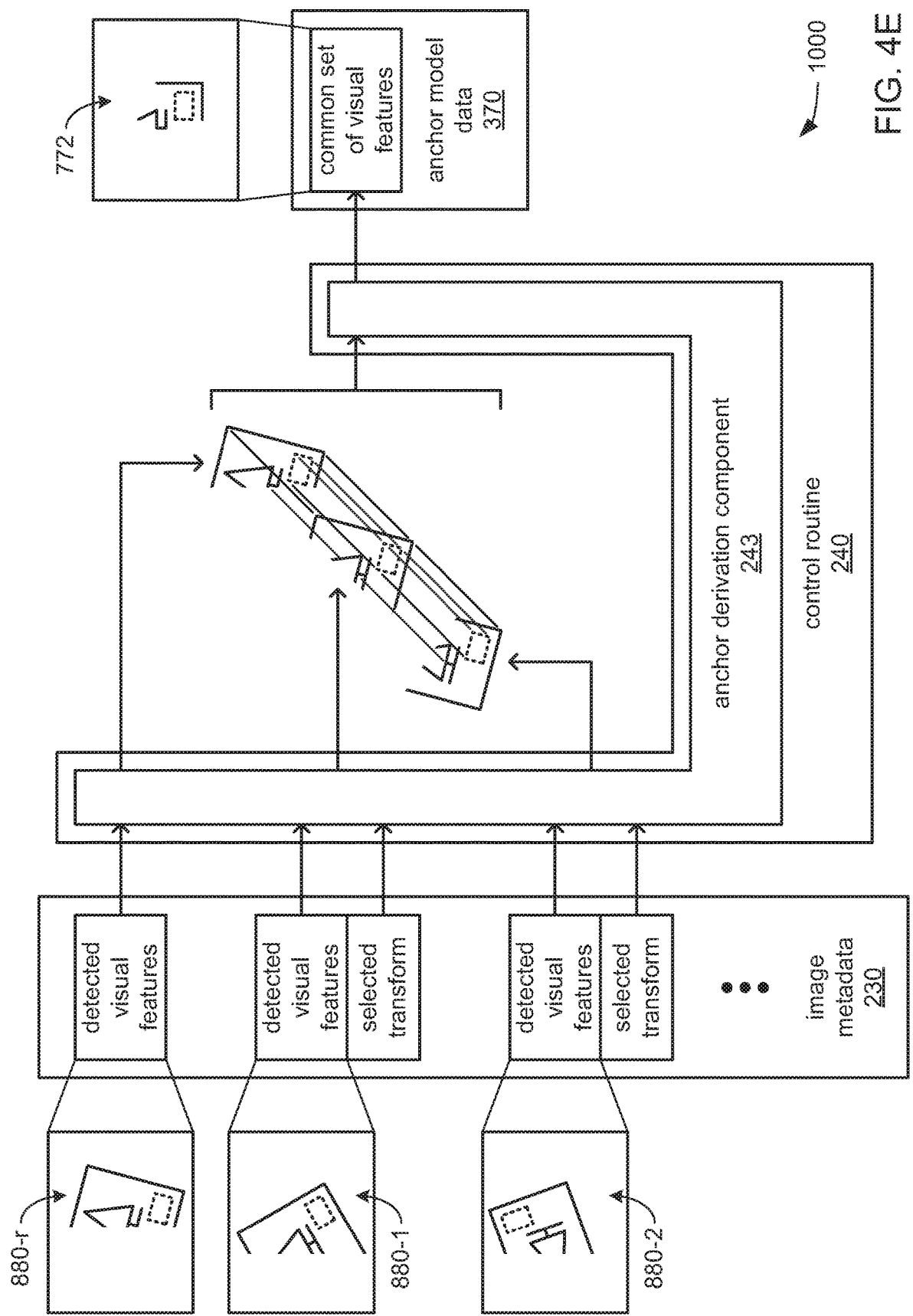

Turning to FIG. 4E, the image metadata 230 may then be provided to the anchor derivation component 243. The processor 550 may be caused by the anchor derivation component 243 to, for each captured training image 880 other than the one designated as the reference image 880-*r* (i.e., for each of the depicted captured training images 880-1 and 880-2, but not for the captured training image 880-*r* that is also designated as the reference image), compare the alignment of detected visual features therein (with its corresponding selected transform applied to those detected visual features) with the detected visual features of the reference image 880-*r*. From the performances of all such comparisons, the processor 550 may be caused to identify a common set of detected visual features that are found to be present at similar locations relative to the ROI 777 within all of the captured training images, including the reference image (i.e., relative to the ROI 777-*r* in the captured training image 880-*r*, as well as relative to each of the ROIs 777 in each of the depicted captured training images 880-1 and 880-2). It is this common set of visual features that may be used, together, to define an anchor 772 that is to be searched for in captured images during the operating mode. By way of example, and as specifically depicted in FIG. 4E, it may be that such an anchor 772 includes line a number of segments that define the boundaries between the background and each of the tree trunk and the ground in the planted tree scenery 778, as well as a number of line segments that define two of the edges of the surface 770 of object 700 that carries the planted tree scenery 778.

Figure 4F:
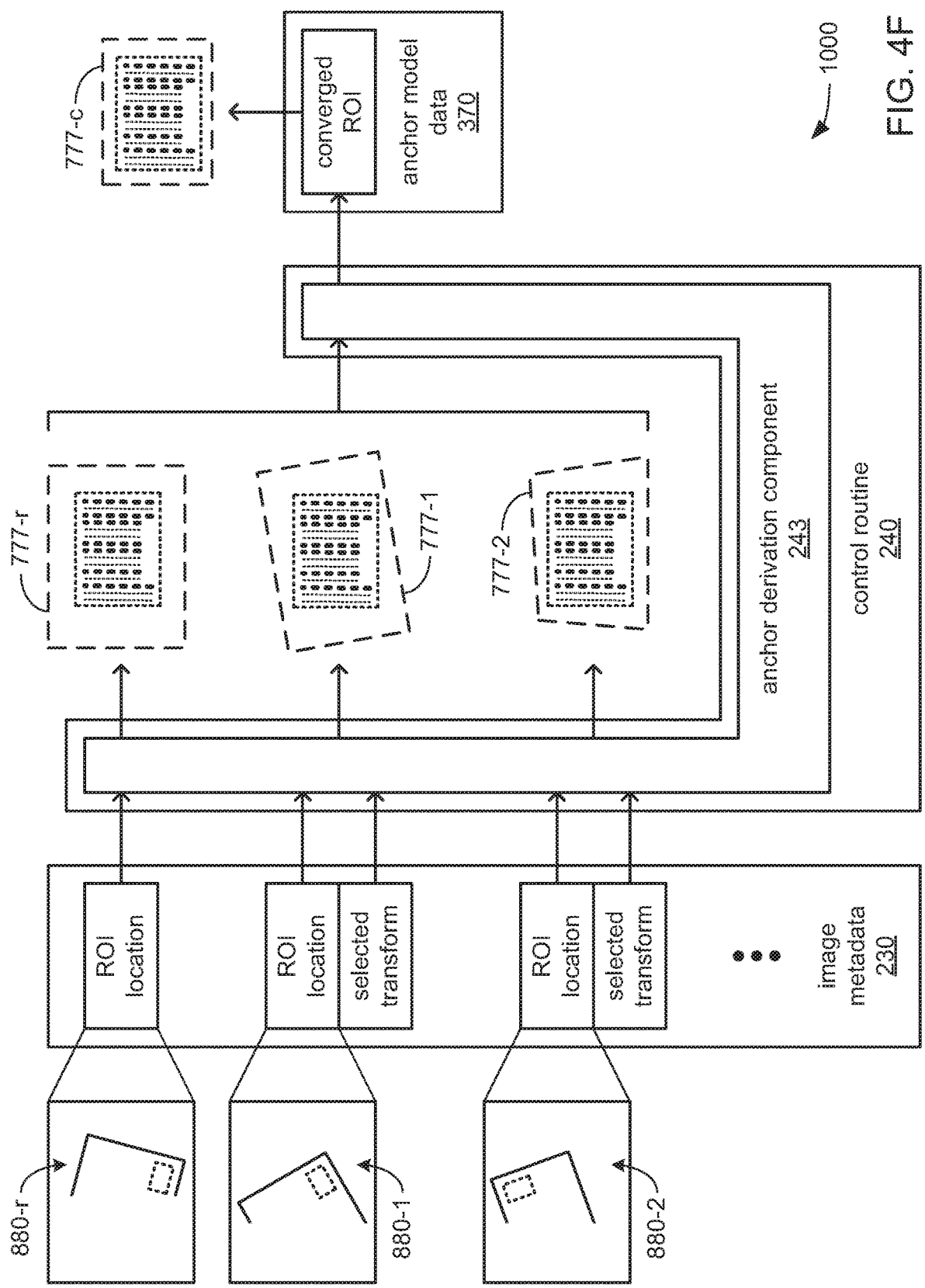

Turning to FIG. 4F, the processor 550 may be further caused by the anchor derivation component 243 to, for each captured training image other than the one designated as the reference image (i.e., for each of the depicted captured training images 880-1 and 880-2, but not for the captured training image 880-*r* that is also designated as the reference image), compare the alignment of the ROI 777 therein (with its corresponding selected transform applied to that ROI 777) with the ROI 777-*r* of the reference image 880-*r*. From the performances of all of such comparisons, the processor 550 may be caused to derive a shape, size, orientation and/or position of a converged ROI 777-*c* from the varying shapes and/or sizes of the ROIs 777 and 777-*r* of all of the captured training images 880 (including the captured training image 880-*r* designated as the reference image). As will be recognized by those skilled in the art of user interfaces, the fact that manual input is used to specify the location of the ROIs 777 within each of the captured training images 880 (including the ROI 777-*r* within the captured training image 880-*r* designated as the reference image) may result in some degree of variation in the boundaries specified in that manual input for each. In some embodiments, the converged ROI 777-*c* may be defined to include only the area that is overlapped by all of the ROIs 777 and 777-*r* among all of the captured training images 880. In such embodiments, such an area may then be further refined to reshape it to generate a rectangular region therefrom for the converged ROI 777-*c* that may be more succinctly described when stored.

Referring to both FIGS. 4E and 4F, with the converged ROI 777-*c* having been derived, the processor may then be caused to store indications of the characteristics and/or location of the converged ROI as part of the anchor model data 370 as part of a definition for an anchor 772 to be searched for in captured images during the operating mode. With the common set of visual features having also been derived, the processor may also be caused to store indications of the characteristics and/or locations (relative to the converged ROI 777-*c* of each of the visual features within the common set of visual features in the anchor model data 370 as another part of the definition for the anchor 772. In embodiments in which the derivation of the converged ROI 777-*c* includes reshaping to derive a rectangular shape therefor, one of the four corners of such a rectangular area may be selected by the processor 550 as the reference point that is referred to in indications within the anchor model data 370 of the relative positions of each visual features of the common set of visual features. In other words, the position of each visual feature of the common set that defines the anchor 772 may be described in the anchor model data 370 as a relative to that selected corner of the converged ROI 777-*c*.

Thus, during the operating mode of the machine vision system 1000, the processor 550 of the decoding device 500 or the processor 150 of each of the one or more cameras 100 may search each captured image for the anchor 772, as defined by the common set of line segments indicated in the anchor model data 370. In response to successfully locating such an anchor 772, the processor 150 or 550 may then use the indications within the anchor model data 370 of where the converged ROI 777-*c* is located relative to those line segments to derive the location within that captured image of where a candidate ROI 777 would be expected to be located, thereby deriving the location within that captured image at which one or more machine vision tasks are to be performed (e.g., decoding the encoded data marking 775 that would be expected to be within that candidate ROI 777).

Figure 5A:
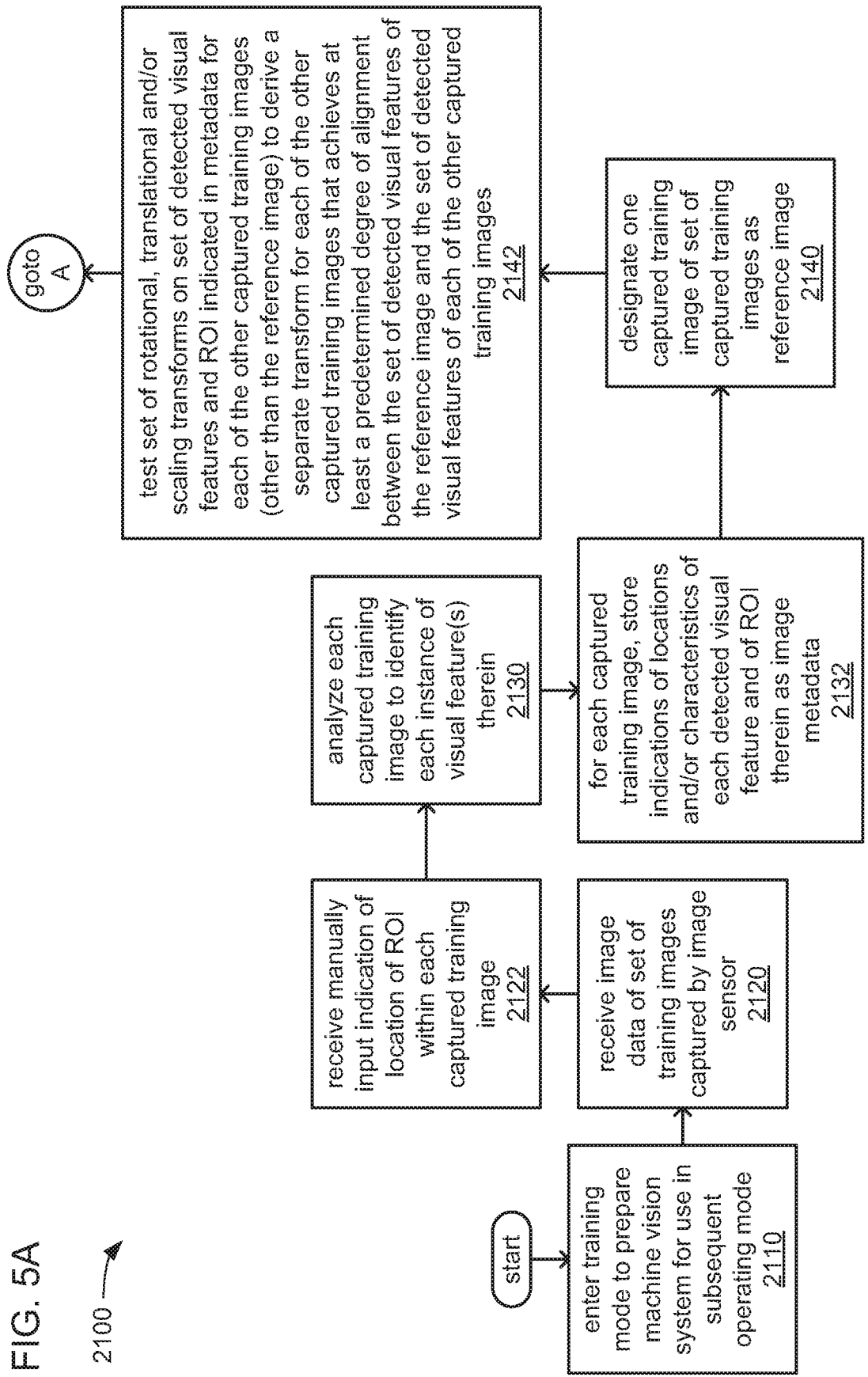

FIGS. 5A and 5B, together, provide a flowchart 2100 depicting aspects of the training mode of the machine vision system 1000. More specifically, FIGS. 5A-B, together, depict aspects of operations performed by at least one processor 550 of one of the control device 500 under the control of instructions of the control routine 240.

At 2110, a machine vision system for the performance of one or more machine vision tasks within candidate ROIs identified within captured images using an anchor (e.g., the machine vision system 1000 of either of FIG. 1A or 1B using an anchor 772 to identify candidate ROIs 777 within captured images) may be placed in a training mode in which the machine vision system may be trained to employ, during its operating mode, the anchor marking in deriving the locations of candidate ROIs in captured images.

At 2120, a processor of the decoding system (e.g., the processor 500 of the control device 500) may receive image data that includes a set of training images captured by an image sensor of a camera (e.g., the set of captured training images 880 captured by the image sensor 110 of one of the one or more cameras 100). At 2122, the processor may also receive, from an input device, manually input indications of the location of an ROI within each captured training image of the set of captured training images (e.g., indications from the input device 520 of the location of an ROI 777 within each of the captured training images 880).

At 2130, the processor may analyze the each of the captured training images in the set of captured training images to detect each instance of one or more pre-selected visual features therein. As has been discussed, in some embodiments, such pre-selected visual features may include more than one of line segments, angles, pre-selected geometric shapes and/or regions of multiple pixels that are all colored with the same color. However, as has also been discussed, in other embodiments, the only visual feature that is searched for and detected may be line segments. At 2132, the processor may store indications of the characteristics and/or locations of the ROI manually indicated to be present within each the captured training images, as well as characteristics and/or locations of each instance of each detected visual feature within each captured training image as part of image metadata for the set of captured training images (e.g., as part of the image metadata 230).

At 2140, the processor may designate one of the captured training images of the set of captured training images to become a reference image for use in subsequent processing steps of the training mode (e.g., one of the captured training images 880 being designated as the captured training image and reference image 880-*r*).

At 2142, the processor, for each of captured training image other than the one designated as the reference image, test each one of multiple transforms on the locations of the detected visual features and the ROI indicated in the image metadata as present therein to determine which transform provides the greatest degree of alignment of the detected visual features and the ROI of each such captured training image with the detected visual features and the ROI of the reference image. In so doing, the processor may derive or select, for each captured training image other than the one designated as the reference image, a transform from the multiple transforms that are tested that causes the alignment of the greatest number of detected visual features thereof with the detected visual features of the reference image.

At 2150, for each of the captured training images other than the one designated as the reference image, the processor may apply its derived or selected transform to the detected visual features thereof to enable a comparison of its set detected visual features to the detected visual features of the reference image to identify a common set of the detected visual features that are present and at similar locations across all of the captured training images, including the reference image. Also, at 2152, for each of the captured training images other than the one designated as the reference image, the processor may apply its derived or selected transform to the ROI thereof to derive a converged ROI from the differing shapes, sizes and/or orientations of the ROIs that are present in all of the captured training images, including the reference image.

At 2154, the processor may store indications of the characteristics and location of the converged ROI, and the characteristics and locations (relative to the converged ROI) of each of the visual features within the common set of visual features as a definition of an anchor model that defines an anchor for subsequent use during the operating mode in deriving the location of a candidate ROI during the operating mode.

At 2170, the machine vision system may exit the training mode as a prelude to being placed in the operating mode, thereby enabling the now derived anchor to be used.

There is thus disclosed a system to capture and decode encoded data. The features set forth below may be combined in any of a variety of ways to create any of a variety of embodiments of a decoding device, a decoding system and/or a method of decoding data encoded within encoded data markings.

A device includes: an image sensor configured to capture images; storage configured to store image data representing the captured images; and a processor communicatively coupled to at least the storage. The processor is configured, during a training mode, to perform operations including: receive a set of training images captured by the image sensor, wherein each captured training image of the set of captured training images includes multiple visual features and a region of interest (ROI); receive manually input indications of a location of the ROI within each captured training image of the set of captured training images; perform at least one of a rotational transform, a translational transform, a scaling transform or a shear transform on the multiple visual features and ROI of at least one captured training image of the set of captured training images to at least partially align the multiple visual features and ROIs among all of the captured training images of the set of captured training images to identify a common set of visual features that are present within all of the captured training images; derive a converged ROI based on at least a portion of the ROI of at least one of the captured training images of the set of captured training images; and generate an anchor model based on a combination of the converged ROI and the common set of visual features, wherein the common set of visual features defines an anchor, a location of each visual feature is specified relative to the converged ROI, and the anchor model is to be used by the processor during an operating mode to derive a location of a candidate ROI relative to the anchor in a captured image.

The multiple visual features of each captured training image of the set of captured training images may include multiple line segments, and the common set of visual features may include the line segments of the multiple line segments within each of the captured training images that are present within all of the captured training images.

The device may include an input device, wherein the processor may be caused to operate at least the input device to provide a user interface (UI) by which the indications of a location of the ROI within each captured training image of the set of captured training images is manually provided.

The performance of at least one of a rotational transform, a translational transform, a scaling transform or a shear transform may include a performance, by the processor, of operations including: select a first captured training image of the set of captured training images to serve as a reference image; and perform the at least one of a rotational transform, a translational transform or a scaling transform on the multiple visual features and ROI of a second captured training image of the set of captured training images to maximize a number of visual features of the multiple of visual features present within the second captured training image that are aligned with corresponding visual features of the multiple visual features present within the first captured training image.

The processor may be further configured to cease the performance of the at least one of a rotational transform, a translational transform, a scaling transform or a shear transform in response to reaching a predetermined limit selected from a group consisting of: a minimum number of corresponding visual features aligned between the first captured training image and the second captured training image; and a maximum number of performances of at least one of a rotational transform, a translational transform, a scaling transform or a shear transform.

The derivation of the converged ROI may include a performance, by the processor, of operations including reshape an area overlapped by the ROIs of all of the captured training images of the set of captured training images to give the converged ROI a rectangular shape.

Use of the anchor model by the processor during the operating mode to derive a location of a candidate ROI in the captured image may include a performance, by the processor, of operations including: search within the captured image for the common set of visual features of the anchor; and in response to the common set of visual features being found within the captured image, use an indication of the location of at least one visual feature of the common set of visual features relative to the converged ROI to derive the location of the candidate ROI within the captured image, wherein the processor is configured to perform operations including perform at least one machine vision task within the candidate ROI, and transmit data output by the performance of the at least one machine vision task to another device via a network.

A machine vision system includes: a camera, wherein the camera includes an image sensor configured to capture images and is configured to use an anchor model, during an operating mode of the machine vision system, to derive a location of a candidate region of interest (ROI) relative to an anchor in a captured image; a manual input device; and a control device communicatively coupled to at least the camera and the input device, and including a processor. The processor is configured, during a training mode of the machine vision system, to perform operations including: receive, from the camera, a set of training images captured by the image sensor, wherein each captured training image of the set of captured training images includes multiple visual features and an ROI; receive, from the input device, manually input indications of a location of the ROI within each captured training image of the set of captured training images; perform at least one of a rotational transform, a translational transform, a scaling transform or a shear transform on the multiple visual features and ROI of at least one captured training image of the set of captured training images to at least partially align the multiple visual features and ROIs among all of the captured training images of the set of captured training images to identify a common set of visual features that are present within all of the captured training images; derive a converged ROI based on at least a portion of the ROI of at least one of the captured training images of the set of captured training images; and generate the anchor model based on a combination of the converged ROI and the common set of visual features, wherein the common set of visual features defines the anchor, and a location of each visual feature is specified relative to the converged ROI.

The multiple visual features of each captured training image of the set of captured training images may include multiple line segments; and the common set of visual features may include the line segments of the multiple line segments within each of the captured training images that are present within all of the captured training images.

The machine vision system may include a display, wherein the processor may be caused to operate at least the input device and the display to provide a user interface (UI) to prompt an operator to operate at least the input device to manually provide the indications of a location of an ROI within each captured training image of the set of captured training images.

The performance of at least one of a rotational transform, a translational transform, a scaling transform or a shear transform on at least one training image of the set of captured training images may include a performance, by the processor, of operations including: select a first captured training image of the set of captured training images to serve as a reference image; and perform the at least one of a rotational transform, a translational transform, a scaling transform or a shear transform on the multiple visual features and ROI of a second captured training image of the set of captured training images to maximize a number of visual features of the multiple of visual features present within the second captured training image that are aligned with corresponding visual features of the multiple visual features present within the first captured training image.

The processor may be further configured to cease the performance of the at least one of a rotational transform, a translational transform, a scaling transform or a shear transform in response to reaching a predetermined limit selected from a group consisting of: a minimum number of corresponding visual features aligned between the first captured training image and the second captured training image; and a maximum number of performances of at least one of a rotational transform, a translational transform, a scaling transform or a shear transform.

Derivation of the converged ROI may include a performance, by the processor, of operations including reshape an area overlapped by the ROIs of all of the captured training images of the set of captured training images to give the converged ROI a rectangular shape.

Use of the anchor model by the camera during the operating mode to derive a location of a candidate ROI in the captured image may include a performance, by the camera, of operations including: search within the captured image for the common set of visual features of the anchor; and in response to the common set of visual features being found within the captured image, use an indication of the location of at least one visual feature of the common set of visual features relative to the converged ROI to derive the location of the candidate ROI within the captured image, wherein the camera is configured to perform operations including perform at least one machine vision task within the candidate ROI, and transmit data output by the performance of the at least one machine vision task to another device via a network.

A method includes, during a training mode, performing operations including: receiving, at a processor and from an image sensor, a set of training images captured by the image sensor, wherein each captured training image of the set of captured training images includes multiple visual features and a region of interest (ROI); receiving, at the processor, manually input indications of a location of the ROI within each captured training image of the set of captured training images; performing, by the processor, at least one of a rotational transform, a translational transform, a scaling transform or a shear transform on the multiple visual features and ROI of at least one captured training image of the set of captured training images to at least partially align the multiple visual features and ROIs among all of the captured training images of the set of captured training images to identify a common set of visual features that are present within all of the captured training images; deriving, by the processor, a converged ROI based on at least a portion of the ROI of at least one of the captured training images of the set of captured training images; and generating, by the processor, an anchor model based on a combination of the converged ROI and the common set of visual features, wherein the common set of visual features defines an anchor, a location of each visual feature is specified relative to the converged ROI, and the anchor model is to be used by the processor during an operating mode to derive a location of a candidate ROI relative to the anchor in a captured image.

The multiple visual features of each captured training image of the set of captured training images may include multiple line segments; and the common set of visual features may include the line segments of the multiple line segments within each of the captured training images that are present within all of the captured training images.

The performance of at least one of a rotational transform, a translational transform, a scaling transform or a shear transform may include performing operations including: selecting, by the processor, a first captured training image of the set of captured training images to serve as a reference image; and performing, by the processor, the at least one of a rotational transform, a translational transform, a scaling transform or a shear transform on the multiple visual features and ROI of a second captured training image of the set of captured training images to maximize a number of visual features of the multiple of visual features present within the second captured training image that are aligned with corresponding visual features of the multiple visual features present within the first captured training image.

The method may include ceasing, by the processor, the performance of the at least one of a rotational transform, a translational transform, a scaling transform or a shear transform in response to reaching a predetermined limit selected from a group consisting of: a minimum number of corresponding visual features aligned between the first captured training image and the second captured training image; and a maximum number of performances of at least one of a rotational transform, a translational transform, a scaling transform or a shear transform.

The derivation of the converged ROI may include performing operations including reshaping an area overlapped by the ROIs of all of the captured training images of the set of captured training images to give the converged ROI a rectangular shape.

Use of the anchor model by the processor during the operating mode to derive a location of a candidate ROI in the captured image may include performing operations including: searching, by the processor, within the captured image for the common set of visual features of the anchor; and in response to the common set of visual features being found within the captured image, using, by the processor, an indication of the location of at least one visual feature of the common set of visual features relative to the converged ROI to derive the location of the candidate ROI within the captured image, wherein the processor is configured to perform operations including performing, by the processor, at least one machine vision task within the candidate ROI, and transmitting, from the processor, data output by the performance of the at least one machine vision task to another device via a network.

The invention claimed is:

1. A device comprising:
   an image sensor configured to capture images;
   storage configured to store image data representing the captured images; and
   a processor communicatively coupled to at least the storage, the processor configured, during a training mode, to perform operations comprising:
   receive a set of training images captured by the image sensor, wherein each captured training image of the set of captured training images comprises multiple visual features and a region of interest (ROI);
   receive manually input indications of a location of the ROI within each captured training image of the set of captured training images;
   perform at least one of a rotational transform, a translational transform, a scaling transform or a shear transform on the multiple visual features and ROI of at least one captured training image of the set of captured training images to at least partially align the multiple visual features and ROIs among all of the captured training images of the set of captured training images to identify a common set of visual features that are present within all of the captured training images;
   derive a converged ROI based on at least a portion of the ROI of at least one of the captured training images of the set of captured training images; and
   generate an anchor model based on a combination of the converged ROI and the common set of visual features, wherein:
   the common set of visual features defines an anchor that is different than the converged ROI;

a location of each visual feature is specified relative to the converged ROI; and the anchor model is to be used by the processor during an operating mode to derive a location of a candidate ROI relative to the anchor in a captured image.

2. The device of claim 1, wherein:

the multiple visual features of each captured training image of the set of captured training images comprises multiple line segments; and the common set of visual features comprises the line segments of the multiple line segments within each of the captured training images that are present within all of the captured training images.

3. The device of claim 1, comprising an input device, wherein the processor is caused to operate at least the input device to provide a user interface (UI) by which the indications of a location of the ROI within each captured training image of the set of captured training images is manually provided.

4. The device of claim 1, wherein the performance of at least one of a rotational transform, a translational transform, a scaling transform or a shear transform comprises a performance, by the processor, of operations comprising:

select a first captured training image of the set of captured training images to serve as a reference image; and perform the at least one of a rotational transform, a translational transform, a scaling transform or a shear transform on the multiple visual features and ROI of a second captured training image of the set of captured training images to maximize a number of visual features of the multiple of visual features present within the second captured training image that are aligned with corresponding visual features of the multiple visual features present within the first captured training image.

5. The device of claim 4, wherein the processor is further configured to cease the performance of the at least one of a rotational transform, a translational transform, a scaling transform or a shear transform in response to reaching a predetermined limit selected from a group consisting of:

a minimum number of corresponding visual features aligned between the first captured training image and the second captured training image; and a maximum number of performances of at least one of a rotational transform, a translational transform, a scaling transform or a shear transform.

6. The device of claim 1, wherein the derivation of the converged ROI comprises a performance, by the processor, of operations comprising reshape an area overlapped by the ROIs of all of the captured training images of the set of captured training images to give the converged ROI a rectangular shape.

7. The device of claim 1, wherein use of the anchor model by the processor during the operating mode to derive a location of a candidate ROI in the captured image comprises a performance, by the processor, of operations comprising:

search within the captured image for the common set of visual features of the anchor; and in response to the common set of visual features being found within the captured image, use an indication of the location of at least one visual feature of the common set of visual features relative to the converged ROI to derive the location of the candidate ROI within the captured image, wherein the processor is configured to perform operations comprising:

perform at least one machine vision task within the candidate ROI; and transmit data output by the performance of the at least one machine vision task to another device via a network.

8. A machine vision system comprising:

a camera, wherein:

the camera comprises an image sensor configured to capture images; and the camera is configured to use an anchor model, during an operating mode of the machine vision system, to derive a location of a candidate region of interest (ROI) relative to an anchor in a captured image;

a manual input device; and a control device communicatively coupled to at least the camera and the input device, and comprising a processor configured, during a training mode of the machine vision system, to perform operations comprising:

receive, from the camera, a set of training images captured by the image sensor, wherein each captured training image of the set of captured training images comprises multiple visual features and an ROI;

receive, from the input device, manually input indications of a location of the ROI within each captured training image of the set of captured training images;

perform at least one of a rotational transform, a translational transform, a scaling transform or a shear transform on the multiple visual features and ROI of at least one captured training image of the set of captured training images to at least partially align the multiple visual features and ROIs among all of the captured training images of the set of captured training images to identify a common set of visual features that are present within all of the captured training images;

derive a converged ROI based on at least a portion of the ROI of at least one of the captured training images of the set of captured training images; and generate the anchor model based on a combination of the converged ROI and the common set of visual features, wherein:

the common set of visual features defines the anchor that is different than the converged ROI; and a location of each visual feature is specified relative to the converged ROI.

9. The machine vision system of claim 8, wherein:

the multiple visual features of each captured training image of the set of captured training images comprises multiple line segments; and the common set of visual features comprises the line segments of the multiple line segments within each of the captured training images that are present within all of the captured training images.

10. The machine vision system of claim 8, comprising a display, wherein the processor is caused to operate at least the input device and the display to provide a user interface (UI) to prompt an operator to operate at least the input device to manually provide the indications of a location of an ROI within each captured training image of the set of captured training images.

11. The machine vision system of claim 8, wherein the performance of at least one of a rotational transform, a translational transform, a scaling transform or a shear transform on at least one training image of the set of captured training images comprises a performance, by the processor, of operations comprising:

select a first captured training image of the set of captured training images to serve as a reference image; and perform the at least one of a rotational transform, a translational transform, a scaling transform or a shear transform on the multiple visual features and ROI of a second captured training image of the set of captured training images to maximize a number of visual features of the multiple of visual features present within the second captured training image that are aligned with corresponding visual features of the multiple visual features present within the first captured training image.

12. The machine vision system of claim 11, wherein the processor is further configured to cease the performance of the at least one of a rotational transform, a translational transform, a scaling transform or a shear transform in response to reaching a predetermined limit selected from a group consisting of:

a minimum number of corresponding visual features aligned between the first captured training image and the second captured training image; and a maximum number of performances of at least one of a rotational transform, a translational transform, a scaling transform or a shear transform.

13. The machine vision system of claim 8, wherein derivation of the converged ROI comprises a performance, by the processor, of operations comprising reshape an area overlapped by the ROIs of all of the captured training images of the set of captured training images to give the converged ROI a rectangular shape.

14. The machine vision system of claim 8, wherein use of the anchor model by the camera during the operating mode to derive a location of a candidate ROI in the captured image comprises a performance, by the camera, of operations comprising:

search within the captured image for the common set of visual features of the anchor; and in response to the common set of visual features being found within the captured image, use an indication of the location of at least one visual feature of the common set of visual features relative to the converged ROI to derive the location of the candidate ROI within the captured image, wherein the camera is configured to perform operations comprising:

perform at least one machine vision task within the candidate ROI; and transmit data output by the performance of the at least one machine vision task to another device via a network.

15. A method comprising, during a training mode, performing operations comprising:

receiving, at a processor and from an image sensor, a set of training images captured by the image sensor, wherein each captured training image of the set of captured training images comprises multiple visual features and a region of interest (ROI);

receiving, at the processor, manually input indications of a location of the ROI within each captured training image of the set of captured training images;

performing, by the processor, at least one of a rotational transform, a translational transform, a scaling transform or a shear transform on the multiple visual features and ROI of at least one captured training image of the set of captured training images to at least partially align the multiple visual features and ROIs among all of the captured training images of the set of captured training images to identify a common set of visual features that are present within all of the captured training images;

deriving, by the processor, a converged ROI based on at least a portion of the ROI of at least one of the captured training images of the set of captured training images; and generating, by the processor, an anchor model based on a combination of the converged ROI and the common set of visual features, wherein:

the common set of visual features defines an anchor that is different than the converged ROI;

a location of each visual feature is specified relative to the converged ROI; and the anchor model is to be used by the processor during an operating mode to derive a location of a candidate ROI relative to the anchor in a captured image.

16. The method of claim 15, wherein:

the multiple visual features of each captured training image of the set of captured training images comprises multiple line segments; and the common set of visual features comprises the line segments of the multiple line segments within each of the captured training images that are present within all of the captured training images.

17. The method of claim 15, wherein the performance of at least one of a rotational transform, a translational transform, a scaling transform or a shear transform comprises performing operations comprising:

selecting, by the processor, a first captured training image of the set of captured training images to serve as a reference image; and performing, by the processor, the at least one of a rotational transform, a translational transform, a scaling transform or a shear transform on the multiple visual features and ROI of a second captured training image of the set of captured training images to maximize a number of visual features of the multiple of visual features present within the second captured training image that are aligned with corresponding visual features of the multiple visual features present within the first captured training image.

18. The method of claim 17, comprising ceasing, by the processor, the performance of the at least one of a rotational transform, a translational transform, a scaling transform or a shear transform in response to reaching a predetermined limit selected from a group consisting of:

a minimum number of corresponding visual features aligned between the first captured training image and the second captured training image; and a maximum number of performances of at least one of a rotational transform, a translational transform, a scaling transform or a shear transform.

19. The method of claim 15, wherein the derivation of the converged ROI comprises performing operations comprising reshaping an area overlapped by the ROIs of all of the captured training images of the set of captured training images to give the converged ROI a rectangular shape.

20. The method of claim 15, wherein use of the anchor model by the processor during the operating mode to derive a location of a candidate ROI in the captured image comprises performing operations comprising:

searching, by the processor, within the captured image for the common set of visual features of the anchor; and in response to the common set of visual features being found within the captured image, using, by the processor, an indication of the location of at least one visual feature of the common set of visual features relative to the converged ROI to derive the location of the candidate ROI within the captured image, wherein the processor is configured to perform operations comprising:

performing, by the processor, at least one machine vision task within the candidate ROI; and transmitting, from the processor, data output by the performance of the at least one machine vision task to another device via a network.

\* \* \* \* \*